United States Patent
Satyanarayana

(10) Patent No.: US 12,376,002 B2
(45) Date of Patent: Jul. 29, 2025

(54) OPTIMIZATION FOR VIRTUAL NETWORK GROUP BROADCAST DATA TRAFFIC PROCESSING IN MOBILE NETWORKS

(71) Applicant: Cisco Technology, Inc., San Jose, CA (US)

(72) Inventor: Mahesh Satyanarayana, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 452 days.

(21) Appl. No.: 17/873,939

(22) Filed: Jul. 26, 2022

(65) Prior Publication Data

US 2024/0040472 A1 Feb. 1, 2024

(51) Int. Cl.
*H04W 76/22* (2018.01)
*H04L 12/46* (2006.01)
*H04W 40/24* (2009.01)
*H04W 40/28* (2009.01)
*H04W 76/40* (2018.01)

(52) U.S. Cl.
CPC ......... *H04W 40/28* (2013.01); *H04L 12/4633* (2013.01); *H04W 40/246* (2013.01)

(58) Field of Classification Search
CPC ....... H04W 76/40; H04W 4/06; H04W 76/12; H04W 4/08; H04W 72/30; H04W 36/0007; H04W 40/02; H04W 76/22; H04W 76/20; H04W 76/11; H04L 45/74; H04L 61/5069
See application file for complete search history.

(56) References Cited

U.S. PATENT DOCUMENTS

| 8,514,756 B1 | 8/2013 | Ramachandra et al. |
| 11,246,011 B1 | 2/2022 | Satyanarayana et al. |

(Continued)

FOREIGN PATENT DOCUMENTS

WO 2021062579 A1 4/2021

OTHER PUBLICATIONS

Nokia, "Support 5G VN Group Communication—unicast traffic," 3GPP TSG-CT WG4 Meeting #93, C4-193246, Change Request, 29.244, CR 0271, Current Version 16.0.0, Aug. 2019, 5 pages.
(Continued)

*Primary Examiner* — Kharye Pope
(74) *Attorney, Agent, or Firm* — Edell, Shapiro & Finnan, LLC

(57) ABSTRACT

Techniques and mechanisms for processing broadcast data traffic for a plurality of user equipments (UEs) of a virtual network group are described herein. In one illustrative example, a user plane function may receive a broadcast packet from one of the UEs or a data network; perform a packet detection rule (PDR) lookup for the broadcast packet, for identifying a PDR and a forwarding action rule (FAR) associated with it; process the broadcast packet in accordance with an apply action of the FAR, for creating a tunnel management message having a payload which encapsulates the broadcast packet; and send the tunnel management message to a base station which is configured to perform unicast data delivery of the broadcast packet to each one of at least some of the plurality of UEs of the virtual network group. The user plane function may configured for use in a public cloud for 5G-as-a-Service (5GaaS).

18 Claims, 17 Drawing Sheets

(56) References Cited

U.S. PATENT DOCUMENTS

| | | | |
|---|---|---|---|
| 11,304,259 B2 | 4/2022 | More et al. | |
| 11,330,667 B2 | 5/2022 | Talebi Fard et al. | |
| 2016/0007316 A1 | 1/2016 | Vaidya et al. | |
| 2020/0015194 A1 | 1/2020 | Li et al. | |
| 2020/0351984 A1 | 11/2020 | Talebi Fard et al. | |
| 2021/0337362 A1 | 10/2021 | Wang | |
| 2021/0392469 A1 | 12/2021 | Wang | |
| 2022/0060416 A1* | 2/2022 | Zhu | H04L 45/742 |
| 2022/0109962 A1* | 4/2022 | Zhu | H04L 47/24 |
| 2022/0150166 A1 | 5/2022 | Yang et al. | |
| 2022/0182321 A1* | 6/2022 | Landais | H04L 45/74 |
| 2022/0295577 A1* | 9/2022 | Yao | H04W 76/10 |
| 2022/0330129 A1* | 10/2022 | Yao | H04W 40/24 |
| 2023/0025738 A1* | 1/2023 | Neelakantamurthy | H04W 76/10 |
| 2023/0171672 A1* | 6/2023 | Yao | H04W 40/00 370/392 |
| 2023/0269220 A1* | 8/2023 | de la Oliva | H04L 61/59 370/312 |
| 2024/0244014 A1* | 7/2024 | De Foy | H04L 45/74 |

OTHER PUBLICATIONS

3GPP, "Section 5.8.2.13 Support for 5G VN group communication," 3GPP TS 23.501, Release 17, V17.4.0, pp. 204-209, Mar. 2022, 6 pages.

Cisco, "Cisco Private 5G," Solution Overview, Cisco Public, Jan. 2022, 5 pages.

3GPP, "LTE; 5G; Interface between the Control Plane and the User Plane nodes," 3GPP TS 29.244, Version 16.5.0, Release 16, ETSI TS 129 244 V16.5.0, Nov. 2020, 317 pages.

Cisco, "Ultra Cloud Core 5G User Plane Function, Release 2022. 01—Configuration and Administration Guide," Feb. 14, 2022, 430 pages.

3GPP, "Technical Specification Group Core Network and Terminals; General Packet Radio System (GPRS) Tunnelling Protocol User Plane (GTPv1-U) (Release 17)," 3GPP TS 29.281, V17.3.0, Jun. 2022, 35 pages.

* cited by examiner

US 12,376,002 B2

1

OPTIMIZATION FOR VIRTUAL NETWORK GROUP BROADCAST DATA TRAFFIC PROCESSING IN MOBILE NETWORKS

TECHNICAL FIELD

The present disclosure relates generally to telecommunications systems, and more particularly to techniques and mechanisms for optimizing virtual network (VN) group broadcast data traffic processing in mobile networks.

BACKGROUND

Fifth Generation (5G) standards define Local Area Network (LAN)-type services for Protocol Data Unit (PDU) sessions established in a 5G network. See, e.g., Third Generation Partnership Project (3GPP) Technical Specification (TS) 23.501 (version 17.3.0). Such LAN-type services involve the creation of virtual network (VN) groups, where each VN group represents a virtual LAN associated with a set of PDU Sessions (i.e., Internet Protocol (IP) endpoints) associated with a plurality of user equipments (UEs).

According to these standards, a User Plane Function (UPF) may facilitate various LAN-type services (e.g., multicast and broadcast traffic processing) within a VN group. Broadcast packet processing involves the UPF operation of stepping through all of the Packet Detection Rules (PDRs) installed at a "5G VN Internal" interface of the UPF, and then replicating the broadcast packet for each matched PDR. If there are a large number of PDU sessions within a VN group, then the UPF must enumerate through the PDRs of all of the numerous PDU sessions and replicate the broadcast packet for each matched PDR.

As is apparent, the above-described processing at the UPF is an expensive in terms of system resource usage (e.g., CPU processing and memory). Such processing also results in the sending of multiple broadcast packets from the UPF to the gNodeB (gNB) (i.e., one packet for each PDU Session), which is especially undesirable in 5G as a Service (5GaaS) scenarios where the UPF may be hosted in a public cloud.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

2

Figure 5:
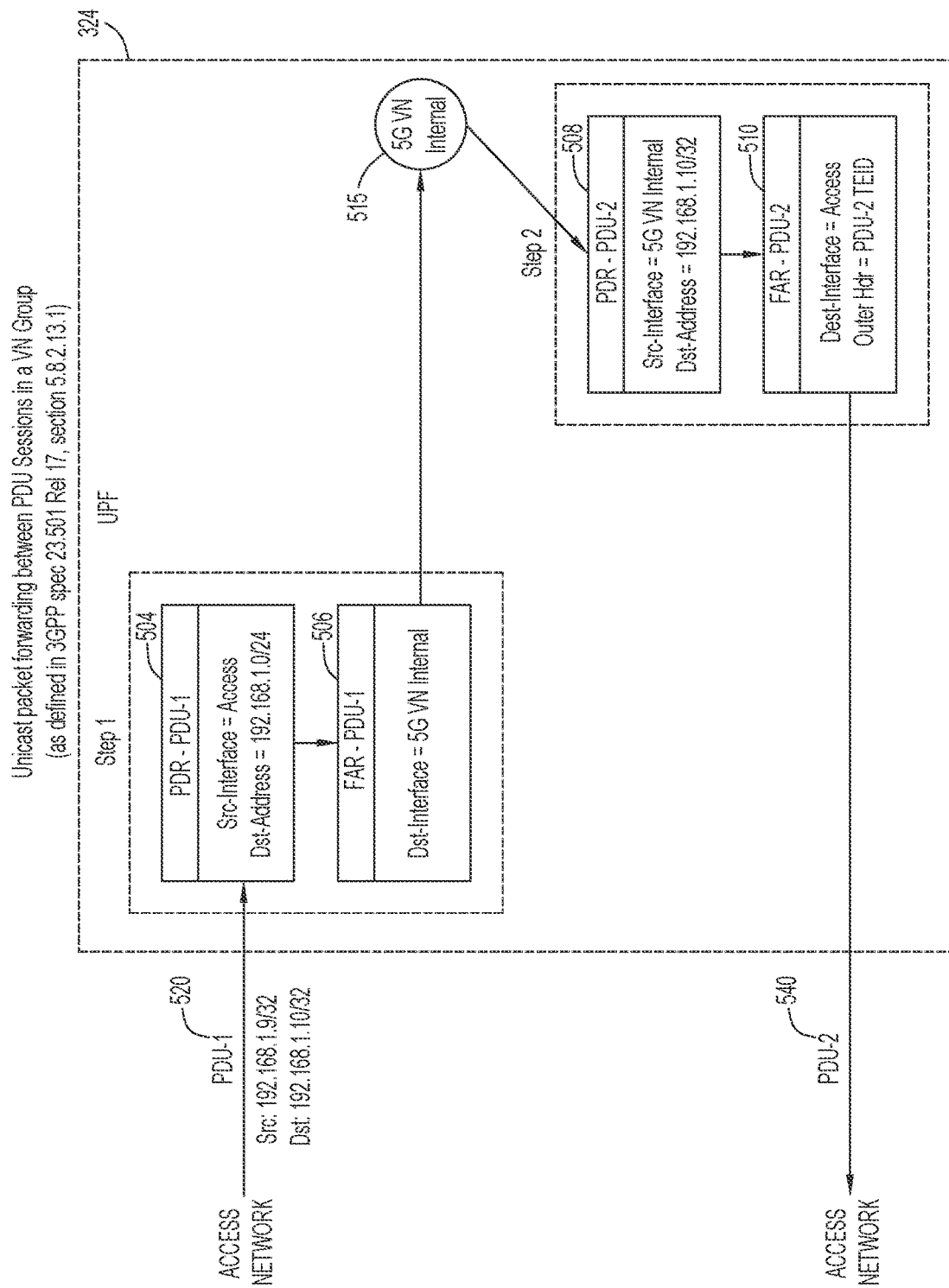
Figure 6:
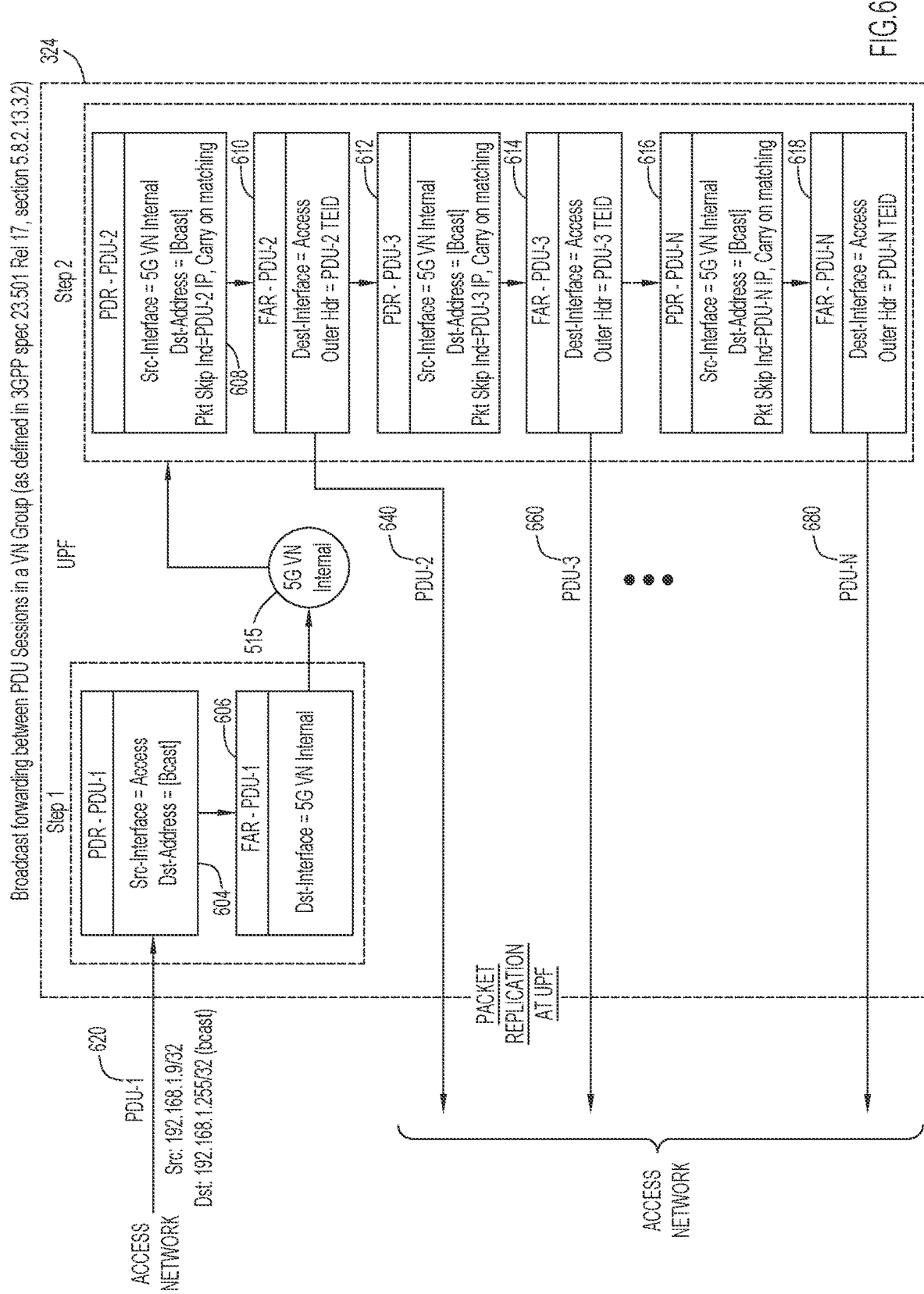
Figure 7:
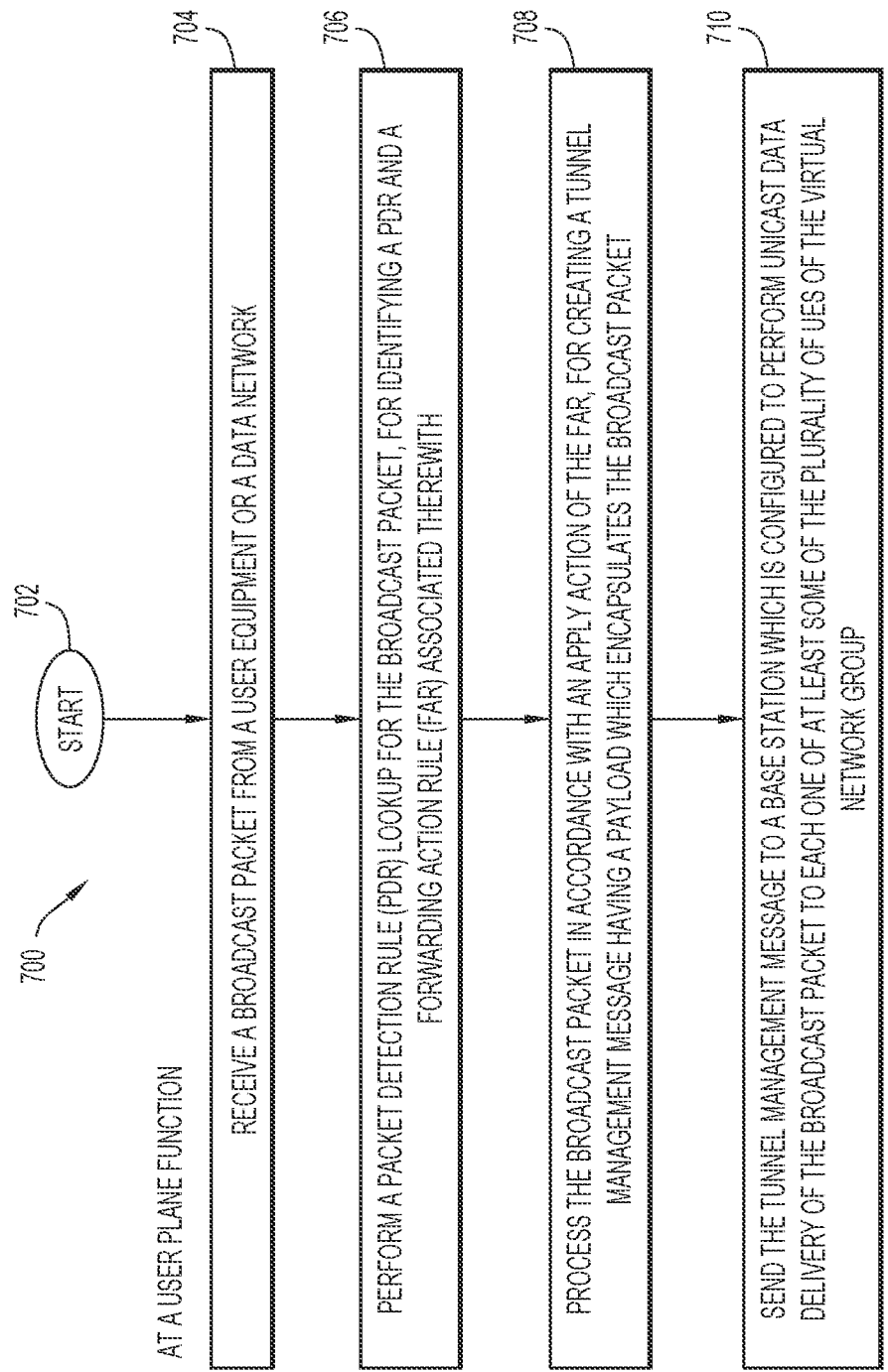
Figure 8A:
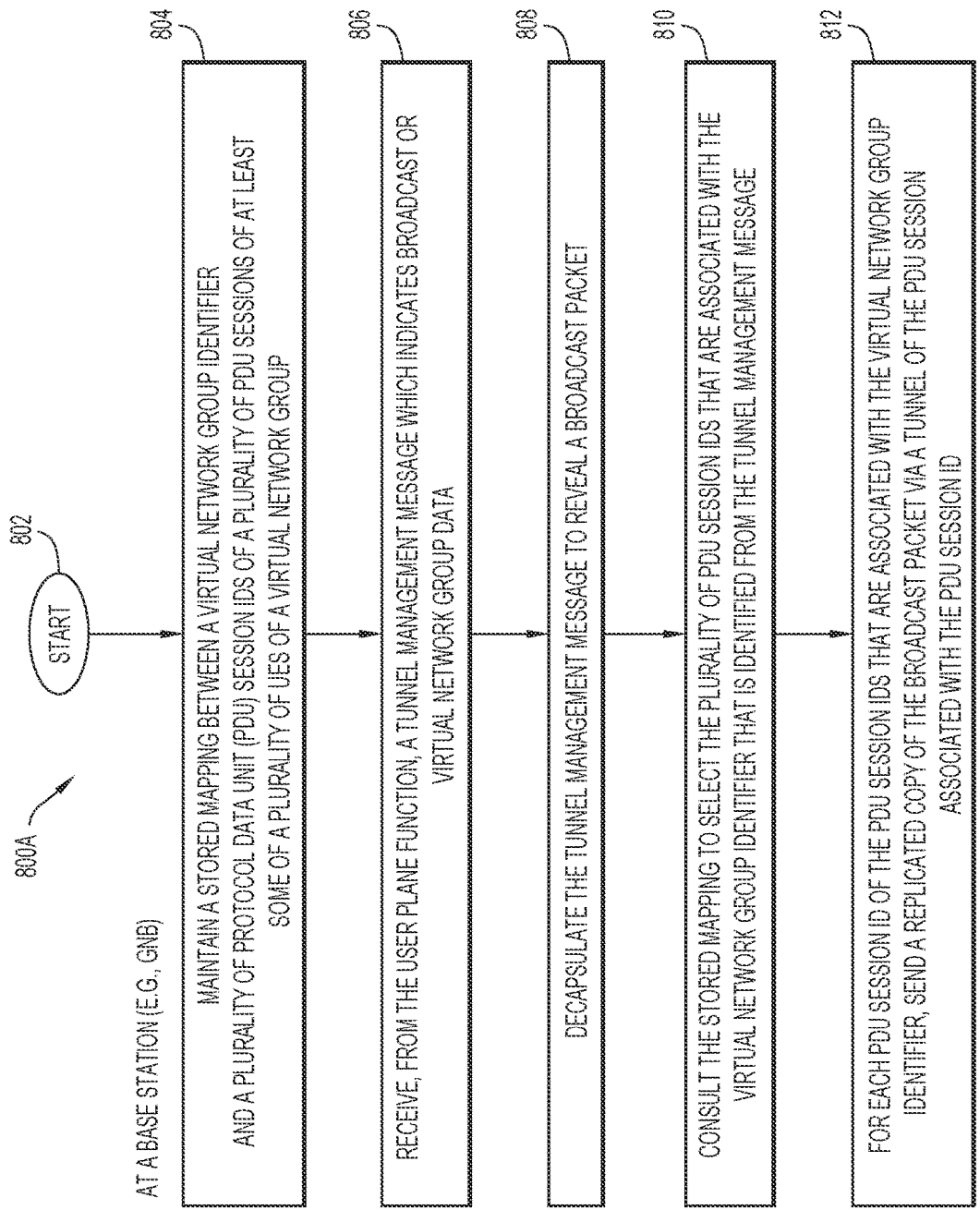
Figure 8B:
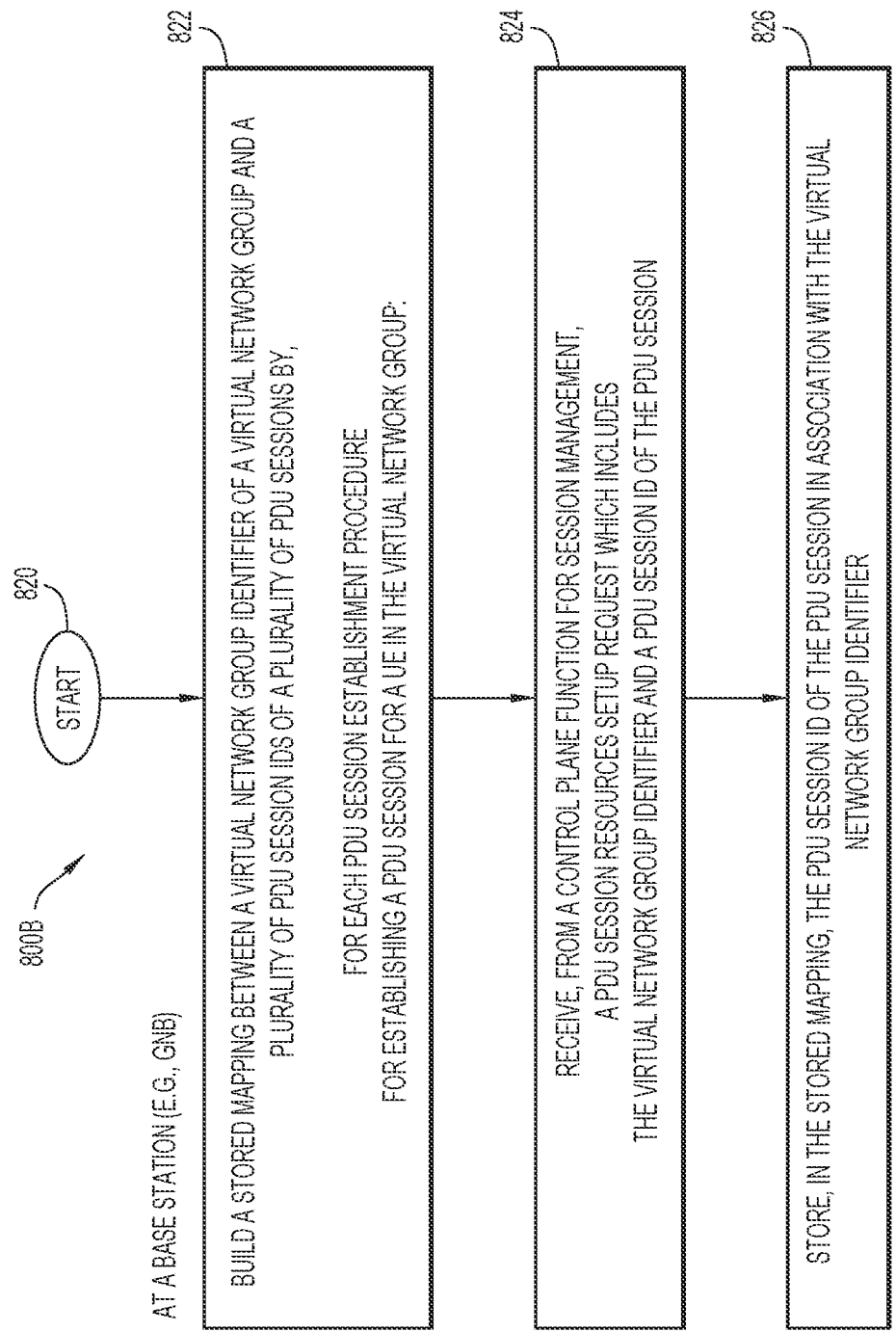
Figure 9:
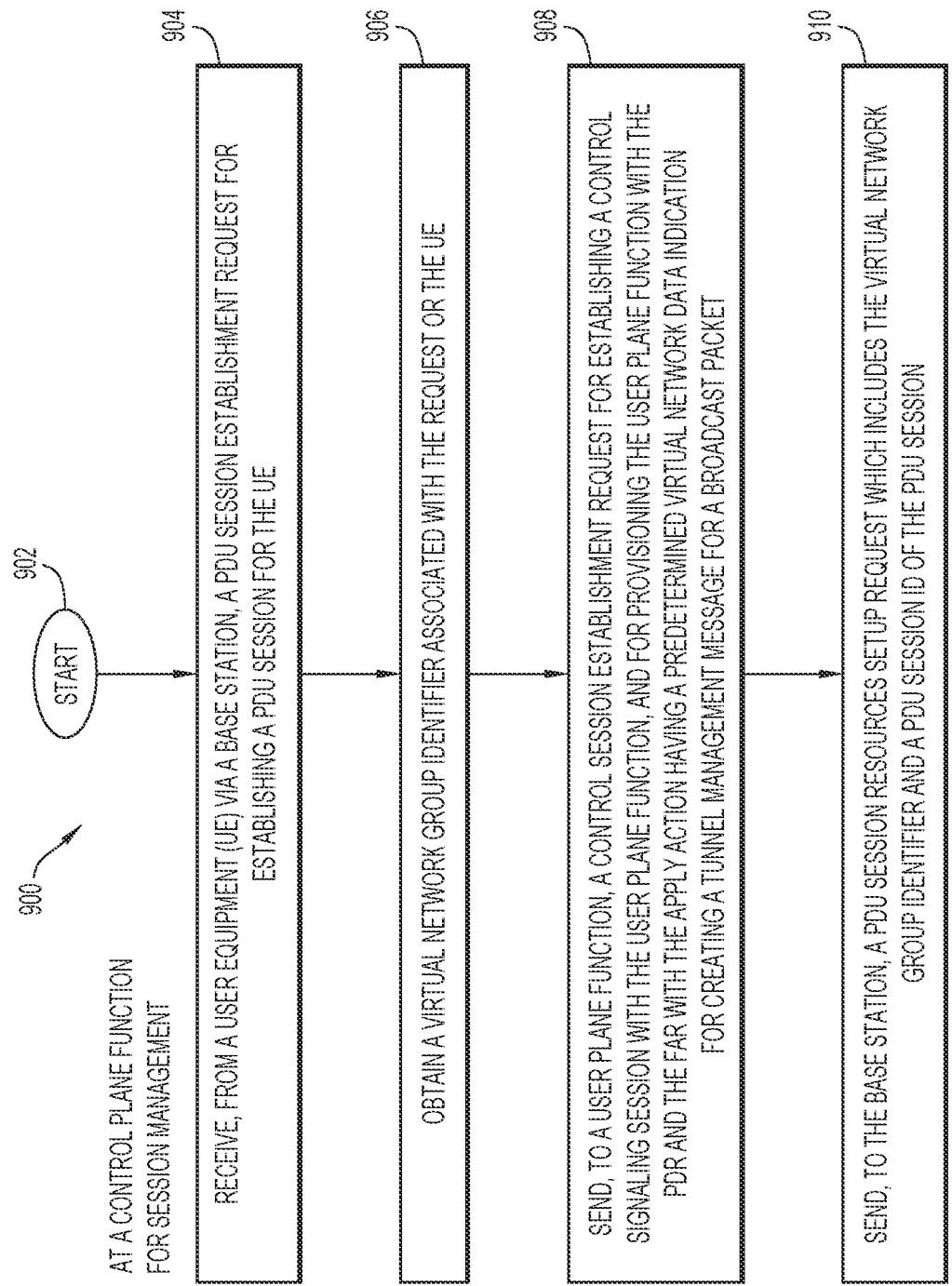
Figure 10A:
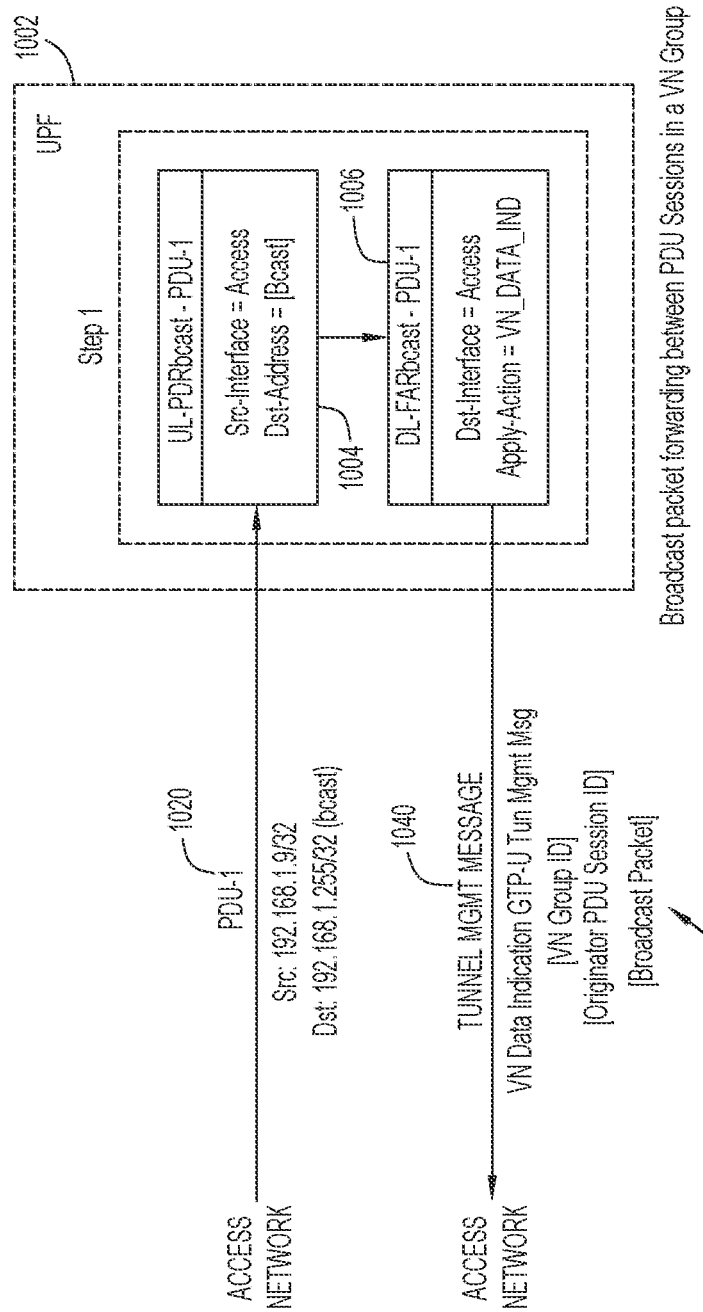
Figure 10B:
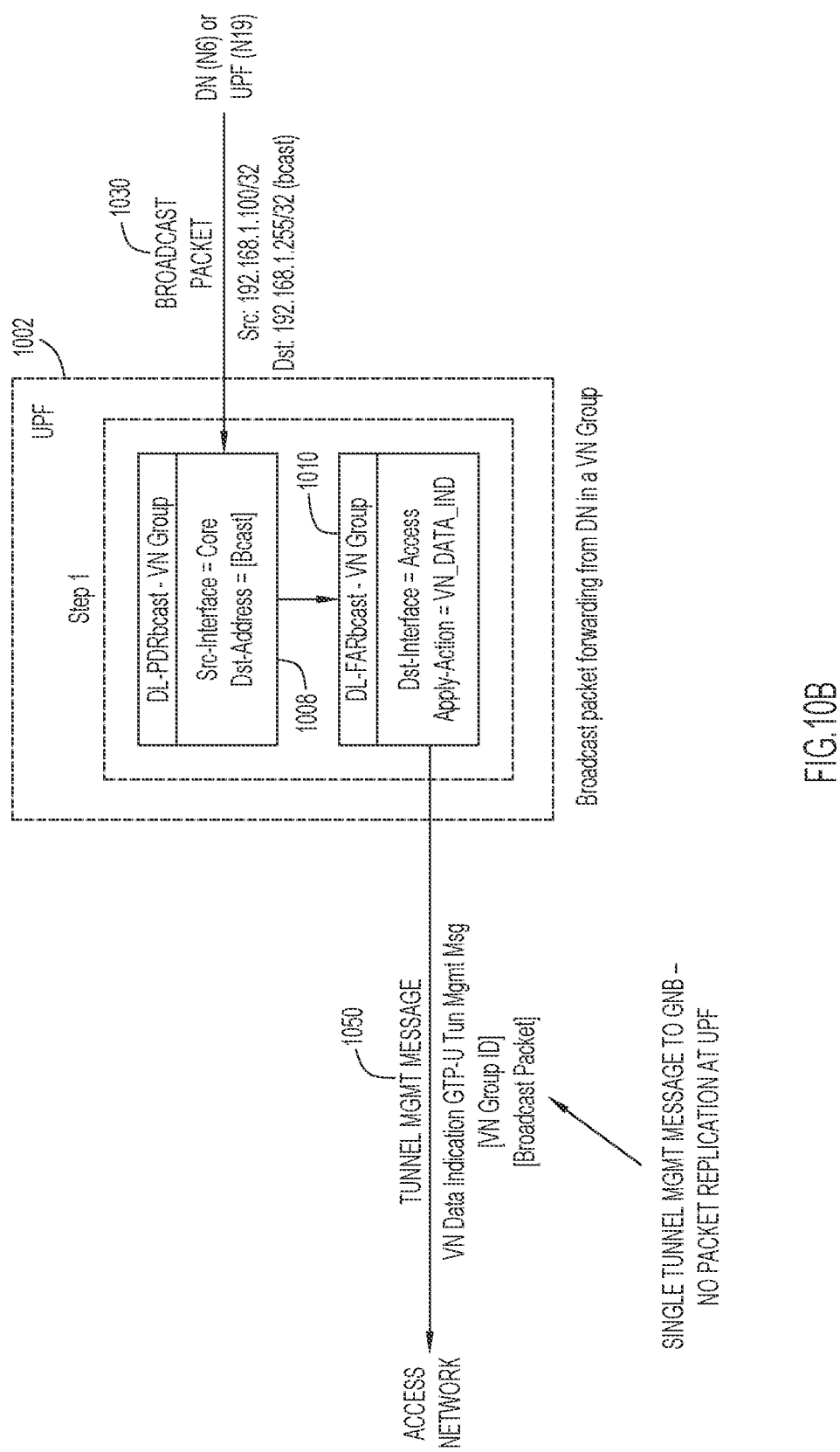
Figure 11A:
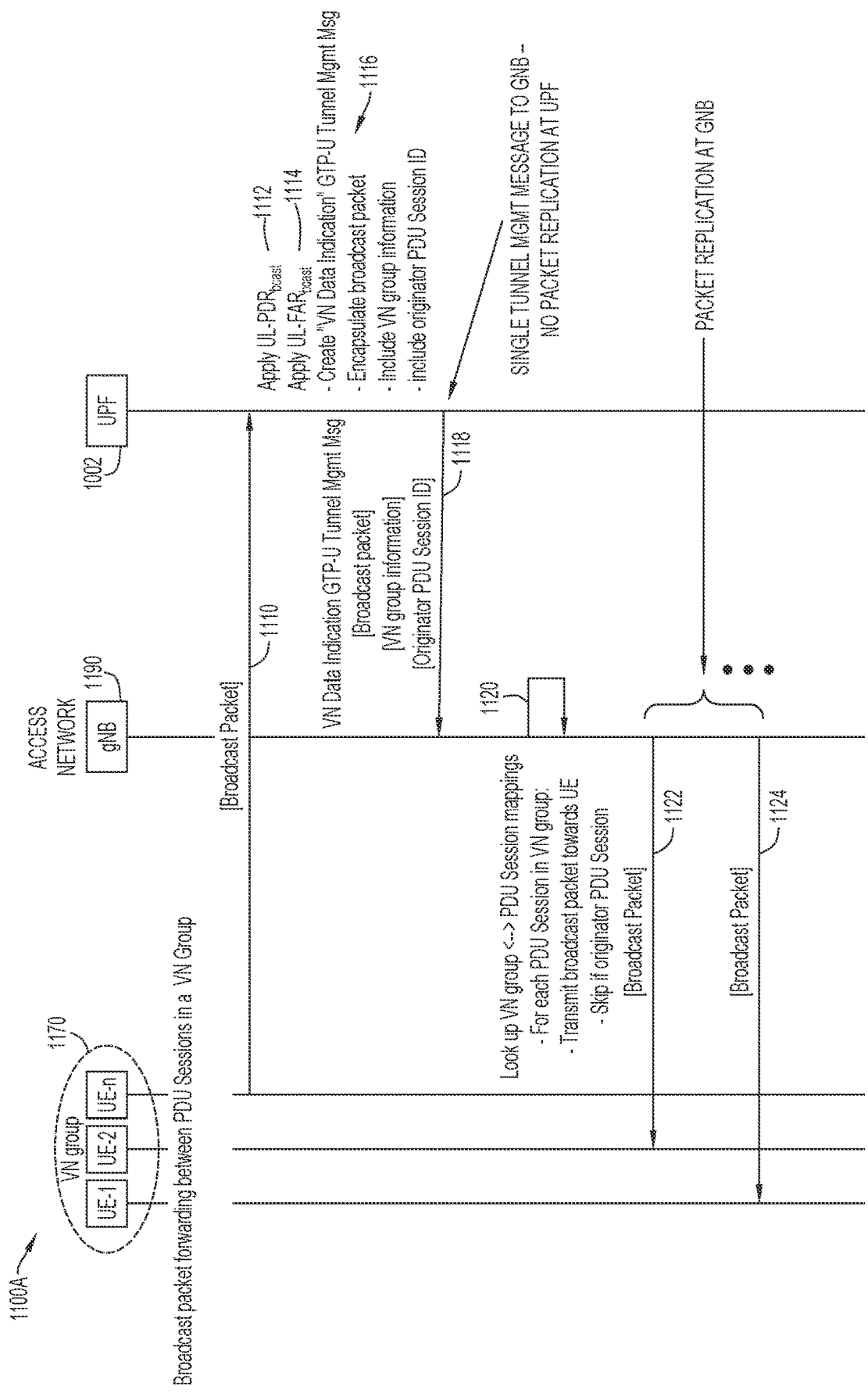
Figure 11B:
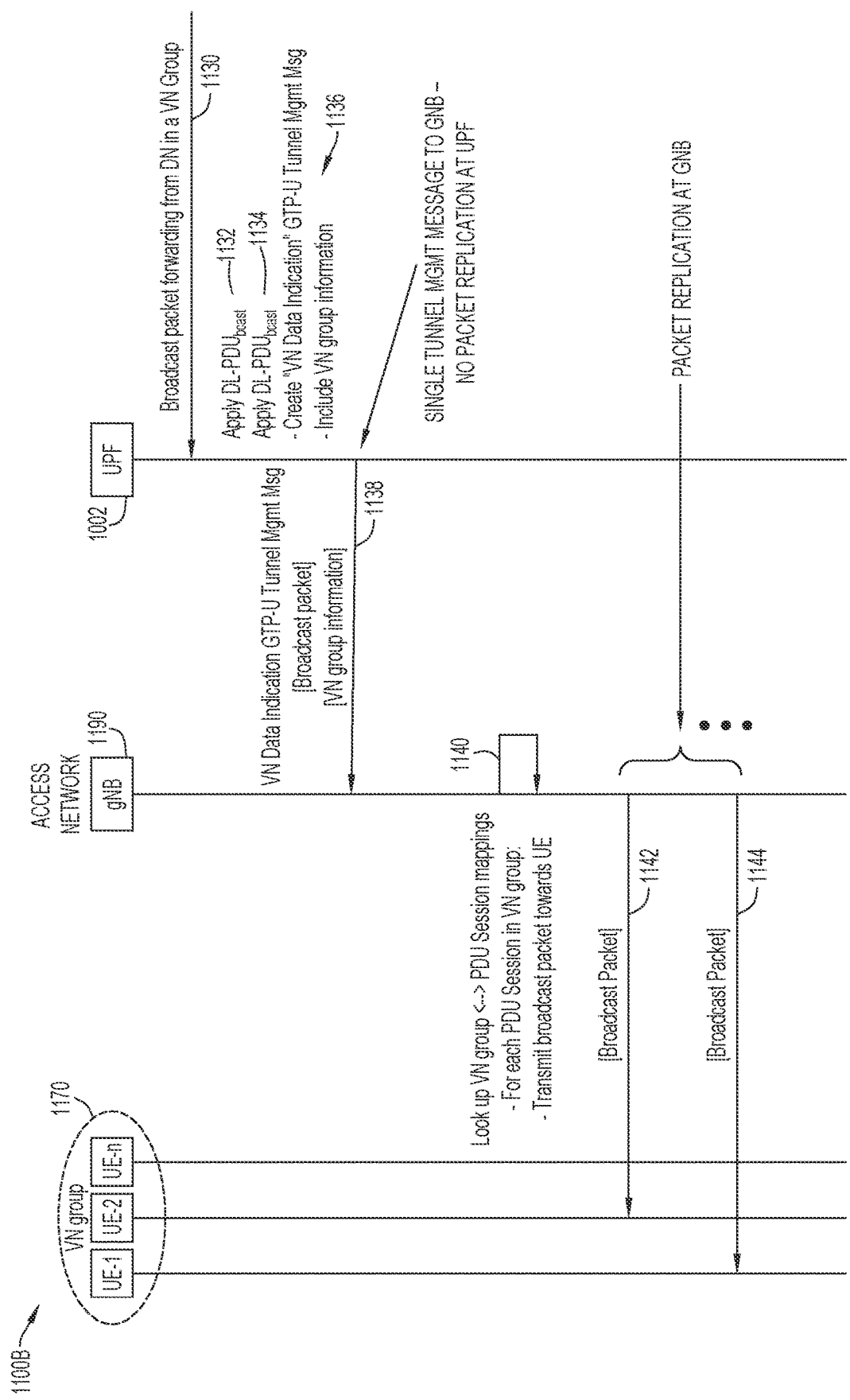
Figure 12:
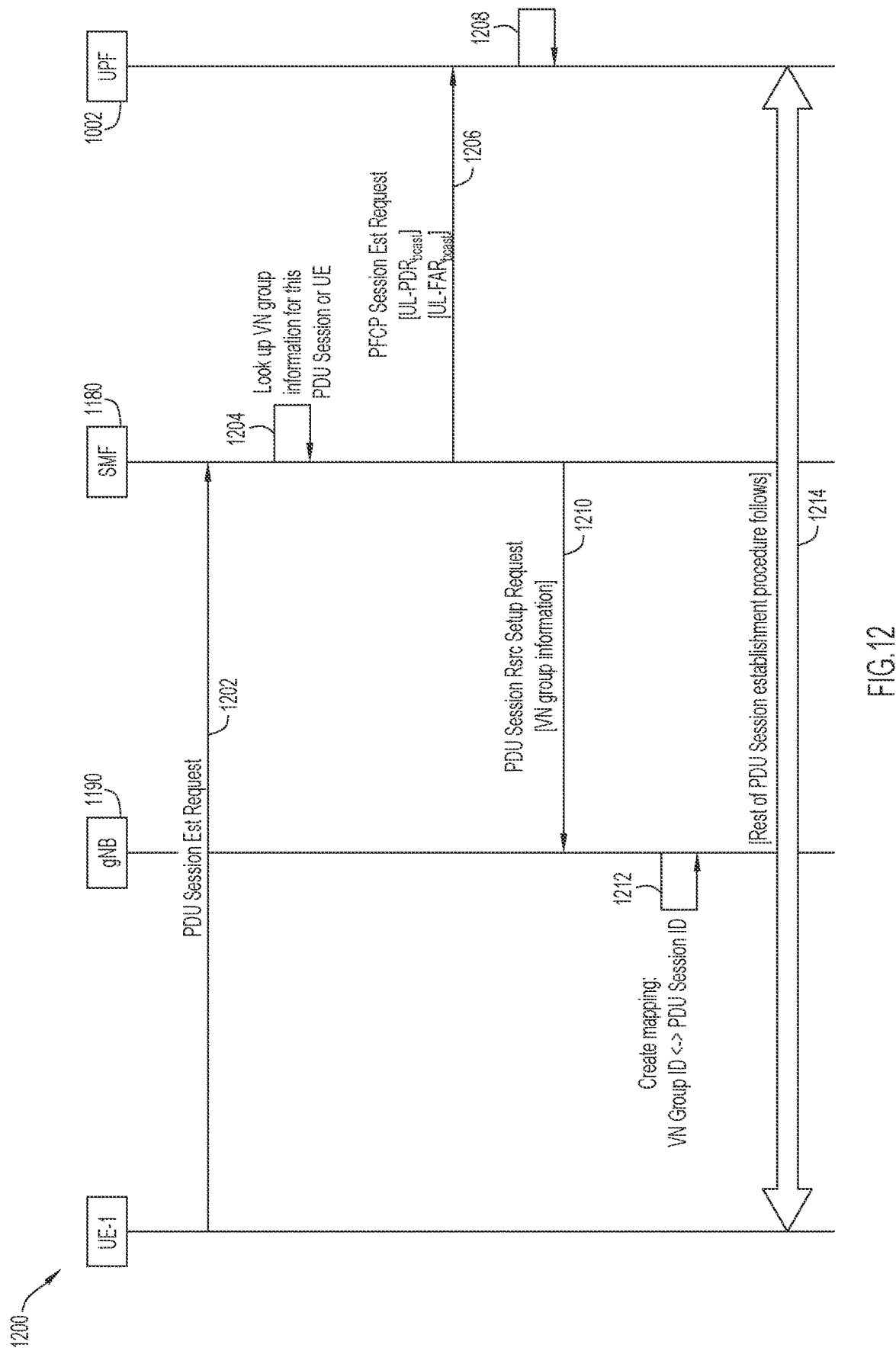
Figure 13:
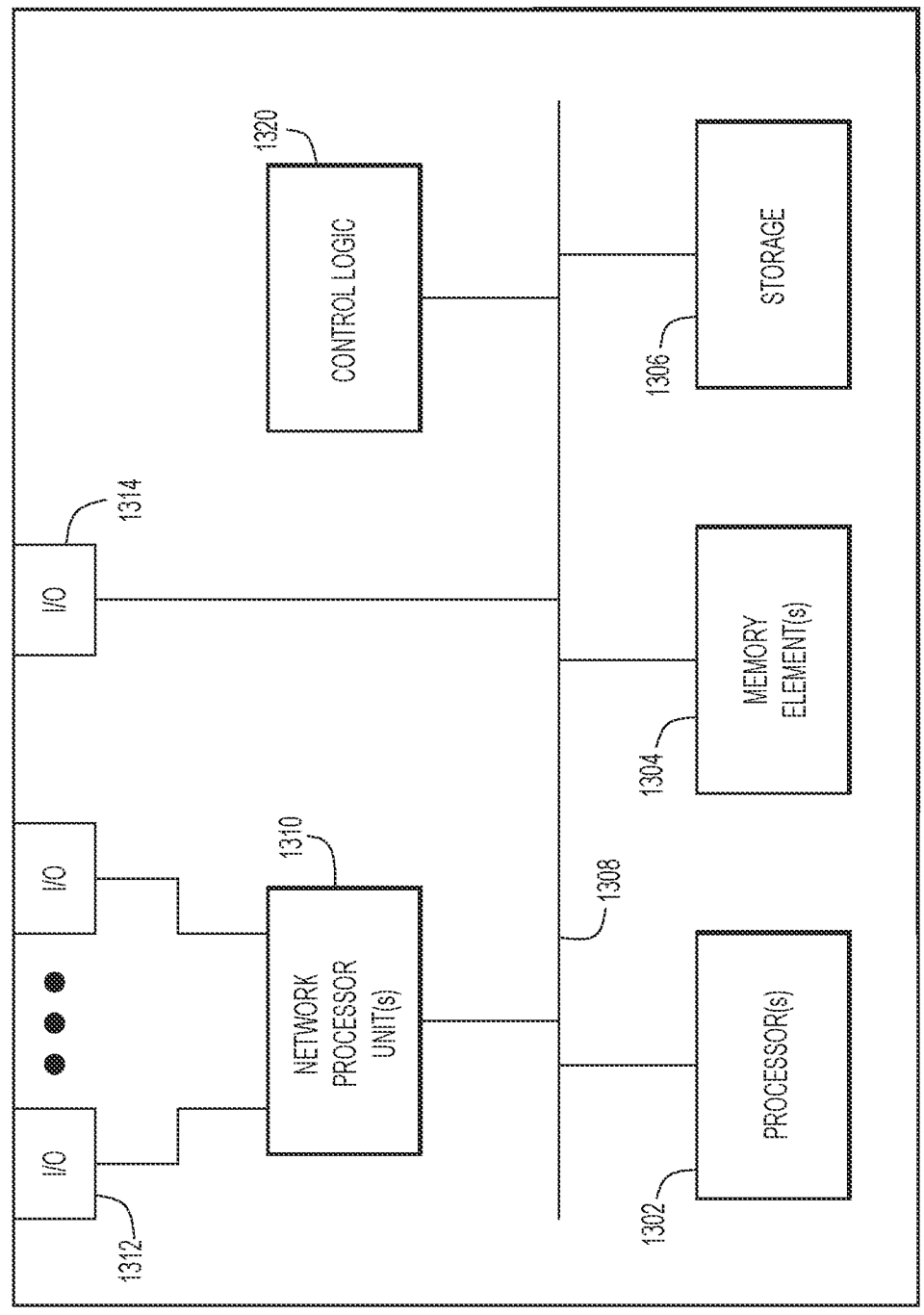

FIG. 5 is an illustrative representation of a conventional two-step mechanism for unicast packet forwarding between protocol data unit (PDU) sessions of a virtual network (VN) group;

FIG. 6 is an illustrative representation of a conventional mechanism for broadcast packet forwarding between PDU sessions of a VN group which is based on the two-step mechanism of FIG. 5;

FIG. 7 is a flowchart for describing a method of processing broadcast data traffic for a plurality of UEs of a VN group in a 5G network according to some implementations of the present disclosure, which may be performed at a user plane function;

FIGS. 8A and 8B are flowcharts for describing methods of processing broadcast data traffic for a plurality of UEs of a VN group in a 5G network according to some implementations of the present disclosure, which may be performed at a base station, such as a gNodeB (gNB);

FIG. 9 is a flowchart for describing a method of processing broadcast data traffic for a plurality of UEs of a VN group in a 5G network according to some implementations of the present disclosure, which may be performed at a control plane function for session management, such as a session management function (SMF);

FIG. 10A is an illustrative representation of a mechanism for broadcast packet forwarding of packets between PDU sessions of a VN group according to some implementations;

FIG. 10B is an illustrative representation of a mechanism for broadcast packet forwarding of packets from a data network (via an N6 interface) or a UPF (via an N19 interface) for a VN group according to some implementations;

FIG. 11A is a call flow diagram of a call flow for processing broadcast data traffic for a plurality of UEs of a VN group in a 5G network according to some implementations of the present disclosure, for packets originating from a PDU session of a UE;

FIG. 11B is a call flow diagram of a call flow for processing broadcast data traffic for a plurality of UEs of a VN group in a 5G network according to some implementations of the present disclosure, for packets originating from a data network (via an N6 interface) or a UPF (via an N19 interface);

FIG. 12 is a call flow diagram of a call flow for setup of broadcast data traffic processing for a plurality of UEs of a VN group in a 5G network according to some implementations of the present disclosure, for packets originating from a PDU session of a UE; and FIG. 13 illustrates a hardware block diagram of a computing device or a network node that may perform functions associated with operations of a network function, such as a user plane function, a control plane function, or a base station or control unit thereof, according to some implementations of the present disclosure.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for optimizing virtual network (VN) group broadcast data traffic processing in mobile networks are described herein.

In one illustrative example, a method of processing broadcast data traffic for a plurality of user equipments (UEs) of a virtual network group in a mobile network is described. The method may be performed at a user plane function and involve receiving a broadcast packet from one of the UEs or a data network; performing a packet detection rule (PDR) lookup for the broadcast packet, for identifying a PDR and a forwarding action rule (FAR) associated therewith; processing the broadcast packet in accordance with an apply action of the FAR, for creating a tunnel management message having a payload which encapsulates the broadcast packet; and sending the tunnel management message to a base station which is configured to perform unicast data delivery of the broadcast packet to each one of at least some of the plurality of UEs of the virtual network group.

In some implementations, the processing the broadcast packet in accordance with the apply action of the FAR further may involve creating the tunnel management message to indicate broadcast or virtual network group data and to include a virtual network group identifier of the virtual network group. In some further implementations, the base station may be configured to perform unicast data delivery of the broadcast packet via a plurality of protocol data unit (PDU) sessions associated with a plurality of PDU session IDs that are stored in association with a virtual network group identifier of the virtual network group. In some other implementations, the processing of the broadcast packet in accordance with the apply action of the FAR may further involve, when the broadcast packet is received from the one of the UEs, creating the tunnel management message to further include an originator PDU session ID of an originator PDU session of the UE, for instructing a bypassing of the unicast data delivery of the broadcast packet via the originator PDU session of the UE.

In some implementations, the PDR may be an uplink (UL) PDR and the FAR may be an UL FAR. Here, the method may further involve, for each PDU session establishment procedure for establishing a PDU session for a UE in the virtual network group, receiving a control plane session establishment request for creating a control plane session for the UE and for provisioning the UL PDR and the UL FAR associated therewith in the user plane function, with the apply action of the UL FAR having a predetermined virtual network data indication for instructing the creating of the tunnel management message for the broadcast packet. In some additional or alternative implementations, the PDR may be a downlink (DL) PDR and the FAR may be a DL FAR. Here, the method may further involve receiving a control plane session establishment request for creating a group-level control plane session for the virtual network group and for provisioning the DL PDR and the DL FAR associated therewith in the user plane function, with the apply action of the DL FAR having a predetermined virtual network data indication for instructing the creating of the tunnel management message for the broadcast packet.

In some implementations, the base station may be configured to maintain a stored mapping between the virtual network group identifier and a plurality of PDU session IDs of a plurality of PDU sessions of the at least some of the plurality of UEs. Here, the method may further involve receiving, from the user plane function, the tunnel management message which indicates the broadcast or virtual network group data; decapsulating the tunnel management message to reveal the broadcast packet; consulting the stored mapping to select the plurality of PDU session IDs that are associated with the virtual network group identifier that is identified from the tunnel management message; and for each PDU session ID of the PDU session IDs that are associated with the virtual network group identifier, sending a replicated copy of the broadcast packet via a tunnel of the PDU session associated with the PDU session ID.

In some implementations, the method of the base station may further involve building the stored mapping between the virtual network group identifier and the plurality of PDU session IDs by, for each PDU session establishment procedure for establishing a PDU session for a UE in the virtual network group, receiving, from a control plane function for session management, a PDU session resources setup request which includes the virtual network group identifier and a PDU session ID of the PDU session; and storing, in the stored mapping, the PDU session ID of the PDU session in association with the virtual network group identifier.

More detailed and alternative techniques and implementations are provided herein as described below.

Example Embodiments

As described in the Background section, Fifth Generation (5G) standards define Local Area Network (LAN)-type services for Protocol Data Unit (PDU) sessions established in a network (see, e.g., Third Generation Partnership Project (3GPP) Technical Specification (TS) 23.501 (v17.3.0)). Such LAN-type services involve the creation of virtual network (VN) groups, where each VN group represents a virtual LAN associated with a set of PDU sessions (i.e., Internet Protocol (IP) endpoints) of a plurality of user equipments (UEs). According to these standards, a User Plane Function (UPF) may facilitate various LAN-type services (e.g., multicast and broadcast traffic processing) within a VN group. Broadcast packet processing involves the UPF stepping through all of the Packet Detection Rules (PDRs) installed at a "5G VN Internal" interface of the UPF, and then replicating the broadcast packet for each matched PDR. If there are a large number of PDU sessions within a VN group, then the UPF must enumerate through the PDRs of all of the PDU sessions and replicate the packet for each matched PDR. As is apparent, such conventional UPF processing is an expensive in terms of system resource usage (e.g., CPU processing and memory). Such processing also results in the sending of multiple broadcast packets from the UPF to the gNodeB (gNB) (i.e., one packet for each PDU session), which is especially undesirable in 5G as a Service (5GaaS) scenarios where the UPF may be hosted in a public cloud.

Figure 1A:
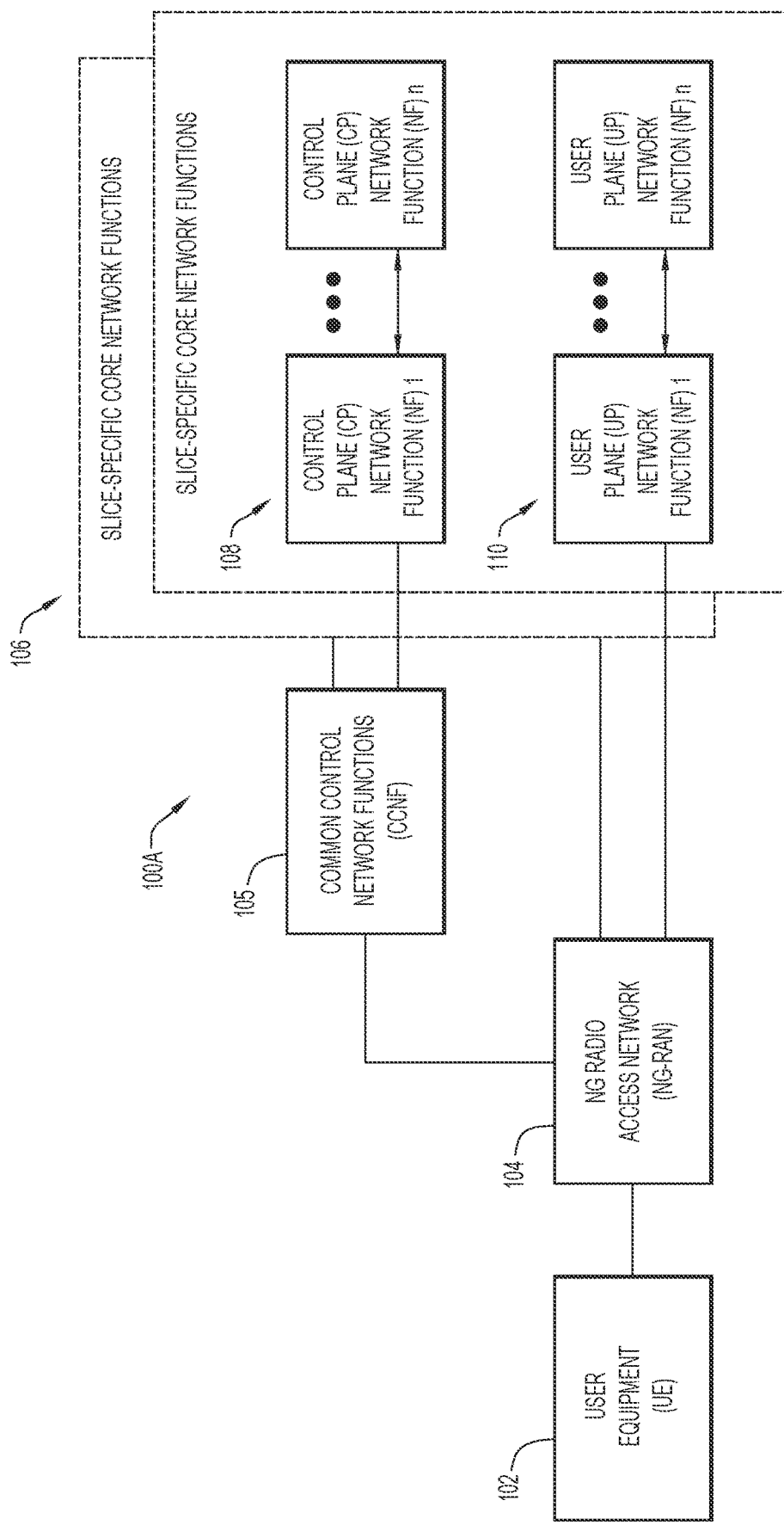
FIG. 1A is an illustrative representation of a basic network architecture of a Fifth Generation (5G) network.

To better explain with reference to the figures, FIG. 1A is an illustrative representation of a general network architecture 100A of a 5G network. Network architecture 100A may include common control network functions (CCNF) 105 and a plurality of slice-specific core network functions 106.

In general, the 5G network is configured to facilitate communications for mobile devices, such as a UE 102. UE 102 may be any suitable type of device, such as a cellular telephone, a smart phone, a tablet device, an Internet of Things (IoT) device, a Machine-to-Machine (M2M) device, and a sensor, to name but a few. UE 102 may obtain access to a 5G Core (5GC) of the 5G network via a radio access network (RAN) 104, which may be or include a Next Generation (NG) RAN (NG-RAN). RAN 104 may include one or more base stations or gNB, such as a gNB 107.

Network architecture 100A of the 5G network may be a Service-Based Architecture (SBA) which provides a modular framework from which common applications can be deployed using components of varying sources and suppliers. The SBA of the 5G network may be configured such that control plane functionality and common data repositories are provided by way of a set of interconnected Network Functions (NFs), each with authorization to access each other's services.

Accordingly, CCNF 105 includes a plurality of NFs which commonly support all sessions for UE 102. UE 102 may be connected to and served by a single CCNF 105 at a time, although multiple sessions of UE 102 may be served by different slice-specific core network functions 106. CCNF 105 may include, for example, an Access and Mobility Management Function (AMF) and a Network Slice Selection Function (NSSF). UE-level mobility management, authentication, and network slice instance selection are examples of functionalities provided by CCNF 105.

Slice-specific core network functions 106 of the network slices may be separated into control plane (CP) NFs 108 and user plane (UP) NFs 110. In general, the user plane carries user traffic while the control plane provides network control signaling. CP NFs 108 are shown in FIG. 1A as CP NF 1 through CP NF n, and UP NFs 110 are shown in FIG. 1A as UP NF 1 through UP NF n. CP NFs 108 may include, for example, a Session Management Function (SMF), whereas UP NFs 110 may include, for example, a UPF.

Figure 1B:
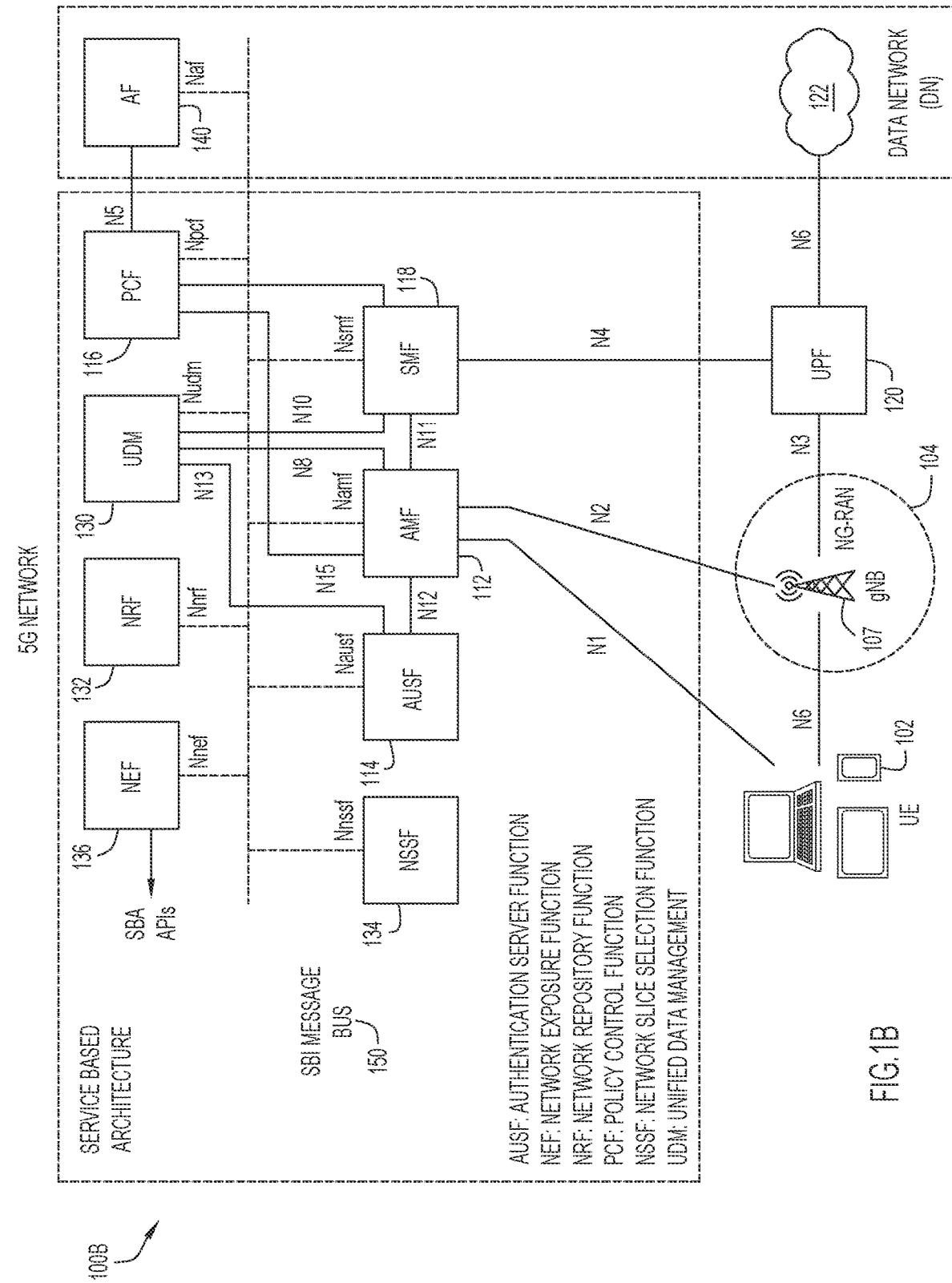
FIG. 1B is an illustrative representation of a more detailed network architecture of the 5G network of FIG. 1A.

FIG. 1B is an illustrative representation of a more detailed network architecture 100B of the 5G network of FIG. 1A. In 3GPP standards for 5G (e.g., 3GPP TS 23.501 and 23.502), network architecture 100B for the 5G network may include an AMF 112, a Policy Control Function (PCF) 116, an SMF 118, and a UPF 120 which may connect to a Data Network (DN) 122. Other NFs in the 5G network include an NSSF 134, a Network Exposure Function (NEF) 136, an NF repository function (NRF) 132, an Authentication Server Function (AUSF) 114, and a Unified Data Management (UDM) function 130.

In FIG. 1B, UPF 120 is part of the user plane and all other NFs (i.e., AMF 112, AUSF 114, PCF 116, SMF 118, and UDM 130) are part of the control plane. Separation of user and control planes guarantees that each plane resource may be scaled independently. It also allows UPFs to be deployed separately from CP functions in a distributed fashion. The NFs in the CP are modularized functions; for example, AMF 112 and SMF 118 may be independent functions allowing for independent evolution and scaling. A plurality of interfaces and/or reference points N1-N8, N10-N13, and N15 shown in FIG. 1B (as well as others) may define the communications and/or protocols between each of the entities, as described in the relevant (evolving) standards documents.

The SBA of the 5G network is well illustrated in FIG. 1B, whereby the control plane functionality and common data repositories are provided by way of the set of interconnected NFs. Assuming the role of either service consumer or service producer, the NFs may be self-contained, independent and reusable. With the SBA, each NF service may expose its functionality through a Service Based Interface (SBI) message bus 150. SBI message bus 150 may employ a Representational State Transfer (REST) interface (e.g., using Hypertext Transfer Protocol Version 2 or "HTTP/2"). As indicated in FIG. 1B, the SBI interfaces of SBI message bus 150 may include an Namf for AMF 112, an Nausf for AUSF 114, an Npcf for PCF 116, an Nsmf for SMF 118, an Nudm for UDM 130, an Nnrf for NRF 132, an Nnssf for NSSF 134, an Nnef for NEF 136, and an Naf for an application function (AF) 140.

UDM 130 may provide services to SBA functions, such as AMF 112, SMF 118 and NEF 136. UDM 130 is typically recognized as a stateful message store, holding information in its local memory. Alternatively, UDM 130 may be stateless, storing information externally within a Unified Data Repository (UDR). UDM 130 may be considered to be analogous to a Home Subscriber Server (HSS), providing authentication credentials while being employed by AMF 112 and SMF 118 to retrieve subscriber data and context. In communication with UDM 130, AUSF 114 provides for authentication, relying on a backend service for computing authentication data and keying materials.

One or more application functions, such as AF 140 may connect to the 5G network. In general, an application function such as AF 140 may interact with the network via NEF 136 in order to access network capabilities. NEF 136 may securely expose network capabilities and events provided by NFs to AF 140, and may provide a means for AF 140 to securely provide information to the 5G network.

NRF 132 may maintain NF profiles of available NF instances and their associated services. An NF instance is an identifiable instance of an NF. NF profiles of NF instances maintained in NRF 132 may include an NF instance ID, NF type (e.g., AMF, SMF, PCR, UPF, etc.), network slice identifiers, such as an NSI ID, NF capacity information, names of supported services, etc. NRF 132 may also support a service discovery function for service discovery associated with the NF profiles. For service discovery, NRF 132 may receive a discovery request from an NF instance and provide information associated with the discovered NF instance to the NF instance in response.

Network slicing is employed in the 5G network to allow operators to logically divide the network into multiple distinct slices, each of which has specific network characteristics and capabilities. Network slicing brings a high degree of deployment flexibility and efficient resource utilization when deploying diverse network services and applications. NSSF 134 may facilitate network slicing in the 5G network, as it operates to select network slice instances (NSIs) for UEs. A logical, end-to-end network slice may have predetermined capabilities, traffic characteristics, and Service Level Agreements (SLAs), and may include the virtualized resources required to service the needs of a Mobile Virtual Network Operator (MVNO) or group of subscribers, including a dedicated UPF 120, SMF 118, and PCF 116.

Each network slice in the 5G network may be identified by an identifier which may be referred to as Single Network Slice Selection Assistance information (S-NSSAI). The S-NSSAI includes a slice/service type (SST) indicator of the slice/service type and a slice differentiator (SD) indicator which helps in differentiating network slices of the same slice type. Different slice/service types or SSTs may include enhanced Mobile Broadband (eMBB), Massive IoT (MIoT), Vehicle-to-everything (V2X), massive Machine-Type Communication (mMTC), and Ultra-Reliable Low-Latency Communication (URLLC). When UE 102 registers with the 5GC, it may send to AMF 112 a registration request which includes a Requested NSSAI and the receive an Allowed NSSAI in response. The Allowed NSSAI may be selected based on the subscription of UE 102 and other criteria. The other criteria may include, for example, include location, network conditions, access-types, operator policies, etc. On receiving the Allowed NSSAI, UE 102 may establish a PDU session to access the intended services using the requested network slice.

Figure 2A:
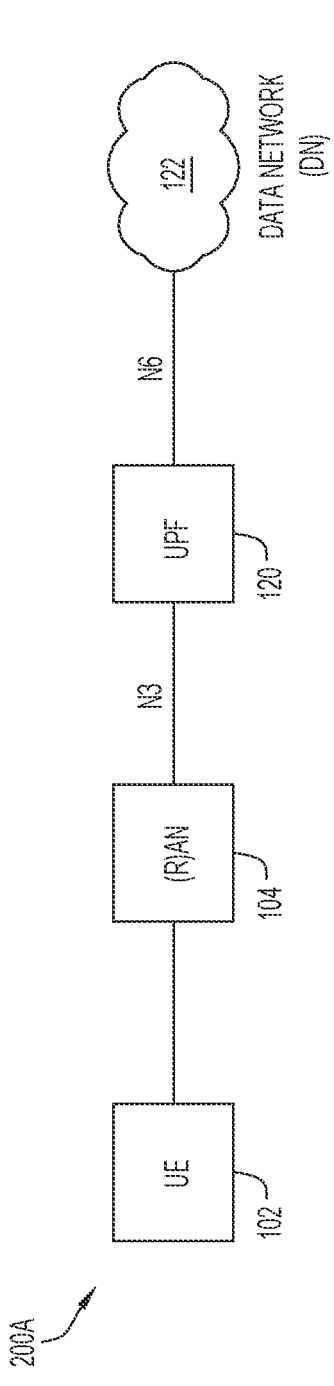
FIG. 2A is an illustrative representation of select network nodes of the 5G network of FIG. 1B, to illustrate some network elements and interfaces for communication between the UE and a data network.
Figure 2B:
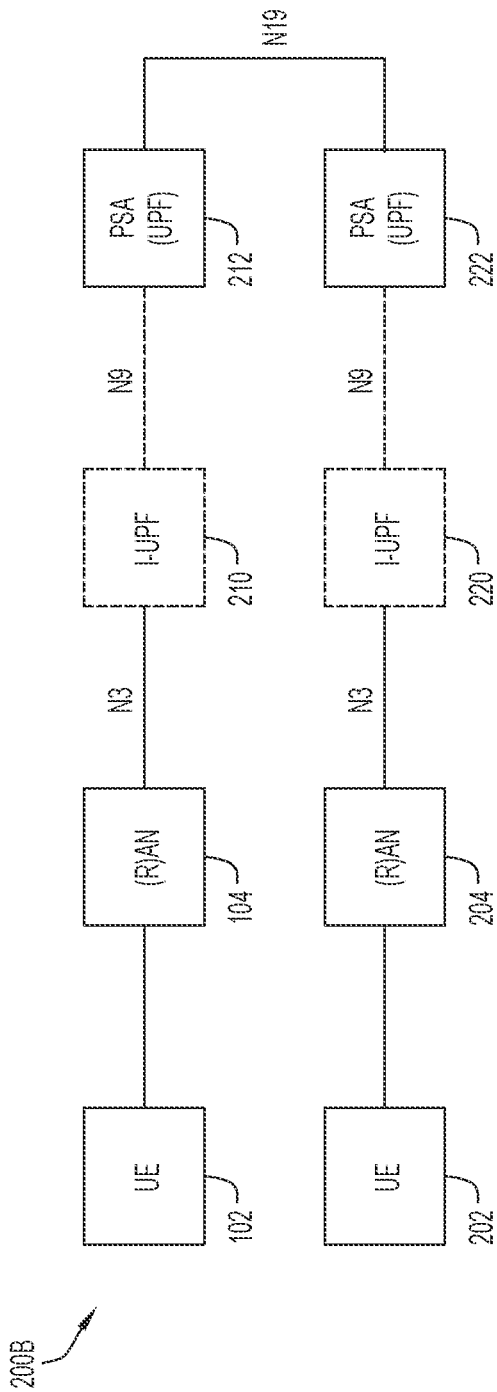
FIG. 2B is an illustrative representation of select network nodes of the 5G network of FIG. 1B, to illustrate some alternative network elements and interfaces for communication between the UE and another UE in the 5G network.

FIG. 2A is an illustrative representation of select network nodes 200A of the 5G network of FIG. 1B to illustrate relevant network elements and interfaces for communication between UE 102 and data network 122. The network elements and interfaces shown in FIG. 2A include an N3 interface between RAN 104 of UE 102 and UPF 120, and an N6 interface between UPF 120 and data network 122. FIG. 2B is an illustrative representation of alternative select network nodes 200B of the 5G network to illustrate other relevant network elements and interfaces for communication between UE 102 and another UE 202 in the 5G network. In FIG. 2B, the other network elements and interfaces include an N3 interface between RAN 104 of UE 102 and an intermediate UPF (I-UPF) 210, and an N9 interface between I-UPF 210 and a PDU session anchor (PSA) 212. The other network elements and interfaces of FIG. 2B also include an N3 interface between a RAN 204 of the other UE 202 and an I-UPF 220, and an N9 interface between I-UPF 220 and a PSA 222. Notably, an N19 interface is used for interconnecting PSA 212 and a PSA 222 for communication between UE 102 and other UE 202 (creating a "hair pin" for communication).

Figure 3:
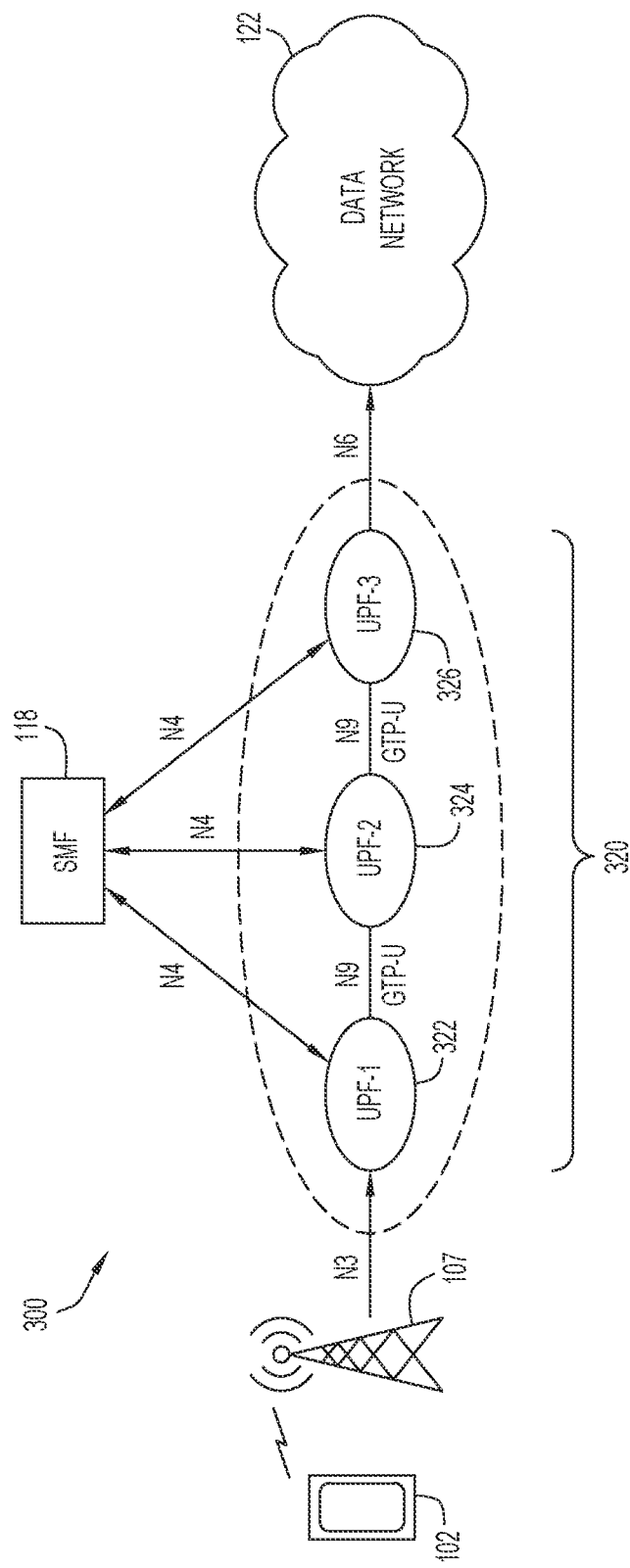
FIG. 3 is an illustration of an example of a network node arrangement including a set of user plane functions (UPFs) in an N9 service chain for carrying user plane traffic between the UE and the data network.

In general, a UPF carries user plane traffic of a PDU session of a UE while an SMF provides control plane signaling to the UPF for managing the PDU session. To better illustrate, FIG. 3 is an illustrative representation of a network node arrangement 300 of select network nodes of the 5G network to provide for such communications. More specifically, network node arrangement 300 includes a set of UPFs 320 in an N9 service chain for carrying user plane traffic between UE 102 and data network 122. In FIG. 3, the set of UPFs 320 include UPFs 322, 324, and 326. In some implementations, the user plane traffic may be transported using General Packet Radio Service (GPRS) Tunneling Protocol—User Plane (GTP-u) as the transport protocol. For session management, SMF 118 may establish control plane signaling sessions over N4 interfaces with each one of UPFs 322, 324, and 326. In some implementations, the control plane signaling sessions may be Packet Forwarding Control Protocol (PFCP) sessions. In each PFCP session, SMF 118 may send packet detection rules (PDRs) and their associated sets of rules to the UPF for controlling packet processing.

Figure 4:
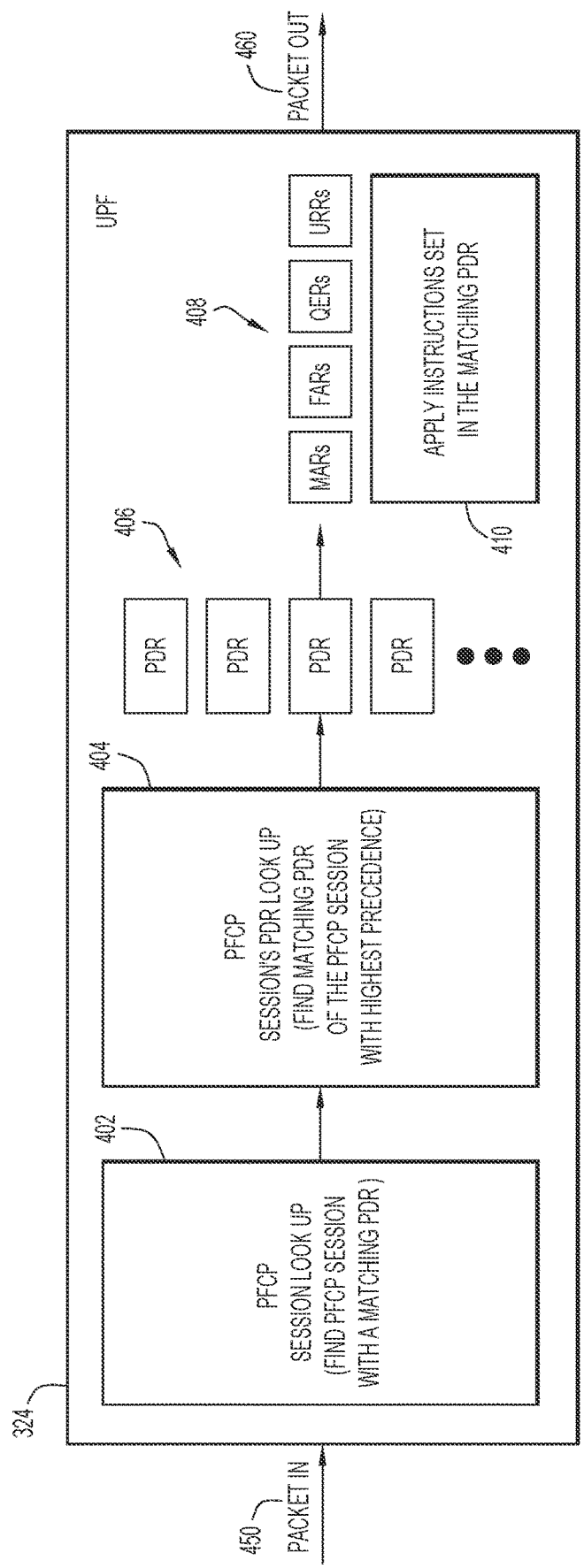
FIG. 4 an illustrative representation of an example of conventional packet processing which may be performed at a UPF.

FIG. 4 an illustrative representation of an example of conventional packet processing which may be performed at a UPF (e.g., UPF 324 of FIG. 3). More specifically, the packet processing illustrated in FIG. 4 is based on FIG. 5.2.1-1 of 3GPP TS 29.244, V16.0.0 (2019-06). Upon receipt of a data packet 450, UPF 324 may locate a matching PFCP session associated with the data packet (a process step 402). UPF 324 may perform a PDR lookup for identifying a matching PDR having the highest precedence amongst a plurality of PDRs 406 (a process step 404). After identifying the matching PDR with the highest precedence, UPF 324 may apply a set of rules 408 (e.g., an "instruction set") associated with the PDR for processing the data packet (a process step 410). The set of rules 408 may include a Forwarding Action Rule (FAR), a QoS Enforcement Rule (QER), a Usage Reporting Rule (URR), and a Buffering Action Rule (BAR), etc. The processed data packet may be forwarded as a processed data packet 460.

UPF 324 may also facilitate various LAN-type services (e.g., multicast and broadcast traffic processing) within a virtual network (VN) group of the 5G network. LAN-type services for PDU sessions are described in 3GPP TS 23.501 (version 17.3.0). Such LAN-type services involve the creation of VN groups, where each VN group represents a virtual LAN associated with a set of PDU sessions of a plurality of UEs. More specifically, 3GPP TS 23.501, Section 5.8.2.13.0 defines a two-step mechanism for traffic forwarding within a VN group.

To better illustrate, FIG. 5 is an illustrative representation of the conventional two-step mechanism for unicast packet forwarding between PDU sessions of a VN group, as defined in 3GPP TS 23.501 (version 17.3.0), Section 5.8.2.13.1.

In Step 1 of the two-step mechanism of FIG. 5, UPF 324 may receive an uplink (UL) packet 520 from a PDU session (e.g., PDU-1) that is destined to a different PDU session (e.g., PDU-2) within the VN group. In the example of FIG. 5, UL packet 520 has a source address of 192.168.1.9/32 and a destination address of 192.168.1.10/32. UPF 324 is provisioned with a PDR 504 associated with PDU-1 indicating a source interface that is set to "Access" and a destination address that is set to 192.168.1.0/24. If the destination address (e.g., 192.168.1.10/32) of UL packet 520 is determined to belong to another PDU session within the VN group, then UL packet 520 will be forwarded to an internal virtual interface. More specifically, UPF 324 applies a FAR 506 associated with PDR 504 (or PDU-1) indicating a destination interface that is set to "5G VN Internal" for forwarding the UL packet 520 to a 5G VN internal interface 515.

In Step 2 of the two-step mechanism of FIG. 5, UPF 324 performs a PDR lookup for identifying a PDR 508 installed at the 5G VN internal interface 515 that belongs to the destination PDU session in the VN group. PDR 508 associated with PDU-2 indicates a source interface that is set to "5G VN Internal" and a destination address that is set to 192.168.1.10/32. UPF 324 may apply a FAR 510 associated with PDR 508 (or PDU-2) that has a destination interface that is set to "Access" and with an outer header that is set to an IP address/a tunnel identifier (TED) associated with PDU-2, for forwarding the UL packet 520 to the destination PDU session (i.e., PDU-2) as a downlink (DL) packet 540 to towards the gNB. The above processing of the unicast packet may be referred to as a "hair pinning" of the packet from one PDU session to another PDU session within a VN group.

3GPP TS 23.501 (version 17.3.0), Section 5.8.2.13.3.2, extends the above-described two-step mechanism to support multicast and broadcast packets (e.g., L2 or L3 broadcast packets). For the conventional processing of broadcast packets, Step 2 of the two-step mechanism of FIG. 5 can be broken down into multiple processing steps. More particularly, for each broadcast packet, the UPF is required to step through all of the PDRs installed at the 5G VN internal interface and then replicate the packet for each matched PDR for forwarding to the gNB.

To better illustrate, FIG. 6 is an illustrative representation of the conventional mechanism for broadcast packet forwarding between PDU sessions of a VN group, as defined in 3GPP TS 23.501 (version 17.3.0), Section 5.8.2.13.3.2.

In Step 1 of FIG. 6, UPF 324 may receive an UL packet 620 from a PDU session (e.g., PDU-1) associated with the VN group. In the example of FIG. 6, UL packet 620 has a source address of 192.168.1.9/32 and a destination address of 192.168.1.255/32 (which indicates "broadcast"). UPF 324 has a PDR 604 associated with PDU-1 indicating a source interface that is set to "Access" and a destination address that is set to "broadcast." If the destination address (e.g., 192.168.1.255/32) of UL packet 620 is determined to be for broadcast within a VN group, then UL packet 620 will be forwarded to an internal virtual interface. More specifically, UPF 324 applies a FAR 606 associated with PDR 604 (or PDU-1) having a destination interface that is set to "5G VN Internal" for forwarding the UL packet 620 to 5G VN internal interface 515.

In step 2 of FIG. 6, UPF 324 performs the multiple processing steps for broadcast message processing. More particularly, UPF 324 may perform a PDR look up for identifying a PDR 608 installed at the 5G VN internal interface 515 for a PDU session within the VN group (e.g., PDU-2). PDR 608 associated with PDU-2 indicates a source interface that is set to "5G VN Internal" and a destination address that is set to "broadcast." UPF 324 may apply a FAR 610 associated with PDR 508 (or PDU-2) that indicates a destination interface that is set to "Access" and an outer header that is set with an IP address/TED associated with PDU-2, for forwarding the UL packet 620 to the destination PDU session as a DL packet 640 (i.e., PDU-2).

As a packet skip indication and carry-on matching is indicated in PDR 608, UPF 324 will continue performing PDR lookups in the 5G VN internal interface 515 for identifying matching PDRs. For example, UPF 324 may perform another PDR look up for identifying a PDR 612 installed at the 5G VN internal interface 515 for another PDU session within the VN group (e.g., PDU-3). PDR 612 associated with PDU-3 indicates a source interface that is set to "5G VN Internal" and a destination address that is set to "broadcast." UPF 324 may apply a FAR 614 associated with PDR 612 (or PDU-3) that indicates a destination interface that is set to "Access" and an outer header that is set with an IP address and a TED associated with PDU-3, for forwarding a replicated copy of the UL packet 620 to the destination PDU session as a DL packet 660 (i.e., PDU-3). Continuing the example, UPF 324 may perform another PDR look up for identifying a PDR 616 installed at the 5G VN internal interface 515 for another PDU session within the VN group (e.g., PDU-N). PDR 616 associated with PDU-N indicates a source interface that is set to "5G VN Internal" and a destination address that is set to "broadcast." UPF 324 may apply a FAR 618 associated with PDR 616 (or PDU-N) that has a destination interface that is set to "Access" and an outer header that is set with an IP address and a TED associated with PDU-N, for forwarding a replicated copy of the UL packet 620 to the destination PDU session as a DL packet 680 (i.e., PDU-N).

As is apparent from the above, broadcast packet processing involves the UPF operation of stepping through all of the PDRs installed at the "5G VN Internal" interface, and then replicating the packet for each matched PDR. If there are thousands of PDU sessions within a VN group, then the UPF ends up enumerating through the PDRs of all of the PDU sessions and replicating the packet for each matched PDR. This may be an expensive operation at the UPF in terms of system resource usage (e.g., CPU, memory). This also results in sending out multiple packets from the UPF to the gNB (i.e., one packet for each PDU session) which may be undesirable, especially in 5GaaS scenarios where the UPF could be hosted on a public cloud.

What are proposed are methods to optimize VN group broadcast traffic handling by replacing, circumventing, or providing an alternative to the conventional two-step mechanism of packet detection and forwarding. This avoids enumeration of multiple PDRs installed at the "5G VN Internal" interface and expensive packet copy operations, and also significantly reduces number of packets sent from the UPF to the gNB. In some implementations, the optimized VN group broadcast traffic handling of the present disclosure may be provided as an (e.g., add-on) alternative to the conventional two-step mechanism, where some VN groups may be processed as is conventional and other VN groups may be processed according to the optimized method.

FIG. 7 is a flowchart 700 for describing a method of processing broadcast data traffic for a plurality of UEs of a VN group in a 5G network according to some implementations of the present disclosure. The method may be performed by a user plane function, such as a UPF or a gateway user plane. The method may be embodied in a computer program product which includes a non-transitory computer readable medium and instructions stored in the non-transitory computer readable medium, where the instructions are executable by one or more processors of a network node having the user plane function. The method of FIG. 7 may be performed together with the method described in relation to FIG. 8A for the base station, FIG. 8B for the base station, and/or FIG. 9 for the control plane function for session management.

Beginning at a start block 702 of FIG. 7, the user plane function may receive a broadcast packet from a UE or a data network (step 704 of FIG. 7). The user plane function may perform a PDR lookup for the broadcast packet, for identifying a PDR and a FAR associated therewith (step 706 of FIG. 7). The user plane function may process the broadcast packet in accordance with an apply action of the FAR, for creating a tunnel management message having a payload which encapsulates the broadcast packet (step 708 of FIG. 7). In some implementations, the user plane function may create the tunnel management message to indicate broadcast or virtual network group data and to include a virtual network group identifier of the virtual network group. The user plane function may send the tunnel management message to a base station, such as a gNB (step 710 of FIG. 7). The base station may be configured to perform unicast data delivery of the broadcast packet to each one of at least some of a plurality of UEs of a virtual network group. In some implementations, the base station may be configured to perform the unicast data delivery of the broadcast packet via a plurality of PDU sessions associated with a plurality of PDU session IDs that are stored in association with the virtual network group identifier.

In some implementations, the method is for use in processing a broadcast packet from the data network. In other implementations, when the broadcast packet is received from one of the UEs in the virtual network group, the user plane function may create the tunnel management message to further include an originator PDU session ID of an originator PDU session of the UE, for instructing (e.g., the UPF) a bypassing of the unicast data delivery of the broadcast packet via the originator PDU session of the UE.

In some implementations, the PDR may be an UL PDR and the FAR may be an UL FAR. Here, the user plane function may be provisioned with each UL PDR and UL FAR as follows. For each PDU session establishment procedure for establishing a PDU session for a UE in the virtual network group, the user plane function may receive a control plane session establishment request for creating a control plane session for the UE and for provisioning the UL PDR and the UL FAR associated therewith in the user plane function, with the apply action of the UL FAR having a predetermined virtual network data indication for instructing the creating of the tunnel management message for the broadcast packet as described herein.

In some additional or alternative implementations, the PDR may be DL PDR and the FAR may be a DL FAR. Here, the user plane function may be provisioned with the DL PDR and the DL FAR as follows. The user plane function may receive a control plane session establishment request for creating a group-level control plane session for the virtual network group and for provisioning the DL PDR and the DL FAR associated therewith in the user plane function, with the apply action of the DL FAR having a predetermined virtual network data indication for instructing the creating of the tunnel management message for the broadcast packet as described herein. In some implementations, the provisioning of the DL PDR and the DL FAR as described herein may be performed at the user plane function(s) when the virtual network group is initially defined and/or (only) at locations of the UEs.

FIG. 8A is a flowchart 800A for describing a method of processing broadcast data traffic for a plurality of UEs of a VN group in a 5G network according to some implementations of the present disclosure. The method may be performed by a base station (such as a gNB) or a control unit thereof, such as a centralized unit (CU) or a distributed unit (DU). The method may be embodied in a computer program product which includes a non-transitory computer readable medium and instructions stored in the non-transitory computer readable medium, where the instructions are executable by one or more processors of a network node which is part of the base station or the control unit thereof (e.g., CU or DU). The method of FIG. 8A may be performed together with the method described in relation to FIG. 7 for the user plane function, FIG. 8B for the base station, and/or FIG. 9 for the control plane function for session management.

Beginning at a start block 802 of FIG. 8A, the base station may maintain a stored mapping between a virtual network group identifier of a virtual network group and a plurality of PDU session IDs of a plurality of PDU sessions of the at least some of a plurality of UEs (step 804 of FIG. 8A). Such a stored mapping may be provided in association with a plurality of different VN groups of the 5G network. The base station may receive, from the user plane function, a tunnel management message which indicates broadcast or virtual network group data (step 806 of FIG. 8A). The base station may decapsulate the tunnel management message to reveal a broadcast packet (step 808 of FIG. 8A). The base station may consult the stored mapping to select the plurality of PDU session IDs that are associated with the virtual network group identifier that is identified from the tunnel management message (step 810 of FIG. 8A). For each PDU session ID of the PDU session IDs that are associated with the virtual network group identifier, the base station may send a replicated copy of the broadcast packet via a tunnel of the PDU session associated with the PDU session ID (step 812 of FIG. 8A).

FIG. 8B is a flowchart 800B for describing a method of processing broadcast data traffic for a plurality of UEs of a VN group in a 5G network according to some implementations of the present disclosure. The method may be performed by a base station (such as a gNB) or a control unit thereof, such as a CU or a DU. The method may be embodied in a computer program product which includes a non-transitory computer readable medium and instructions stored in the non-transitory computer readable medium, where the instructions are executable by one or more processors of a network node which is part of the base station or the control unit thereof (e.g., CU or DU). The method of FIG. 8B may be performed together with the method described in relation to FIG. 7 for the user plane function, FIG. 8A for the base station, and/or FIG. 9 for the control plane function for session management.

Beginning at a start block 820 of FIG. 8B, the base station may build a stored mapping between a virtual network group identifier of a virtual network group and a plurality of PDU session IDs of a plurality of PDU sessions of a plurality of UEs (step 822 of FIG. 8B). The stored mapping may be built by, for each PDU session establishment procedure for establishing a PDU session for a UE in the virtual network group, the base station may receive, from a control plane function for session management, a PDU session resources setup request which includes the virtual network group identifier and a PDU session ID of the PDU session (step 824 of FIG. 8B). In response, the base station may store, in the stored mapping, the PDU session ID of the PDU session in association with the virtual network group identifier (step 826 of FIG. 8B). Again, steps 824 and 826 may be repeated for each PDU session establishment request of the same or different UE for initiating the PDU session establishment procedure. In some implementations, the building of stored mappings may be performed in association with a plurality of different VN groups of the 5G network.

FIG. 9 is a flowchart 900 for describing a method of processing broadcast data traffic for a plurality of UEs of a VN group in a 5G network according to some implementations of the present disclosure. The method may be performed by a control plane function, such as a control plane function for session management, such as an SMF. The method may be embodied in a computer program product which includes a non-transitory computer readable medium and instructions stored in the non-transitory computer readable medium, where the instructions are executable by one or more processors of a network node having the control plane function. The method of FIG. 9 may be used for the provisioning of the UL PDRs and associated FARs for each PDU session and/or the building of the stored mapping at the base station (e.g., gNB). The method of FIG. 9 may be performed together with the method described in relation to FIG. 7 for the user plane function, FIG. 8A for the base station, and/or FIG. 8B for the base station.

Beginning at a start block 902 of FIG. 9, the control plane function may receive, from a UE via a base station, a PDU session establishment request for establishing a PDU session for the UE (step 904 of FIG. 9). In response, the control plane function may obtain the virtual network group identifier based on the PDU session establishment request or the UE (step 906 of FIG. 9). The control plane function may send, to a user plane function, a control session establishment request for establishing a control signaling session with the user plane function (step 908 of FIG. 9). This request is also for provisioning the PDR and associated FAR with the apply action, which has a predetermined virtual network data indication for instructing the creating of the tunnel management message for the broadcast packet as described herein. The control plane function may also send, to the base station (e.g., gNB), a PDU session resources setup request which includes the virtual network group identifier and a PDU session ID of the PDU session (step 910 of FIG. 9). The PDU session resources setup request of step 910 may be used for instructing the base station in the building of the stored mapping between the virtual network group identifier and the plurality of PDU session IDs of the plurality of PDU sessions as described herein (see, e.g., the method of FIG. 8B). The control plane function may perform remaining conventional processing steps for establishing the PDU session for the UE.

As is apparent, the techniques and mechanisms of the present disclosure for optimizing VN group broadcast traffic handling may replace, circumvent, or provide an alternative to the two-step mechanism of conventional packet detection and forwarding. Again, in some implementations, the optimized VN group broadcast traffic handling of the present disclosure may be provided as an (e.g., add-on) alternative to the conventional two-step mechanism, where some VN groups may be processed as is conventional and other VN groups may be processed according to the optimized method. The processing of the present disclosure avoids the enumeration of multiple PDRs installed at the "5G VN Internal" interface and expensive packet copy operations, and also significantly reduces number of packets sent from the UPF to the gNB.

Additional details now follow. For setting up the optimized broadcast messaging according to some implementations of the present disclosure, each PDU session establishment request from a UE in the VN group may be handled as follows. In response to receiving the PDU session establishment request, the SMF may include VN group information (e.g., VN Group ID) in a "PDU Session Resource Setup Request" message to be sent to the gNB (e.g., an NG Application Protocol (NGAP) message). Upon receipt, the gNB may extract the VN group information (e.g., VN Group ID) from the "PDU Session Resource Setup Request" and build an association between the VN group and the PDU session. Essentially, the gNB will maintain a list of all of the PDU sessions associated with a VN group.

In addition, the SMF may include a special UL PDR/FAR combination (i.e., UL-PDR$_{bcast}$ and UL-FAR$_{bcast}$) in a "PFCP Session Establishment Request" to the UPF for the PDU session in order to process the UL broadcast packet. The UPF may install the UL-PDR$_{bcast}$ and the UL-FAR$_{bcast}$ for the PDU session. The UL PDR/FAR combination may be defined as follows: UL-PDR$_{bcast}$==>Source interface=ACCESS, Destination-address=[Broadcast address]; UL-FAR$_{bcast}$==>Apply-action=VN_DATA_INDICATION, Destination interface=ACCESS. Again, the Apply-action indicates a new apply-action type "VN_DATA_INDICATION" used to indicate special handling for broadcast packets arriving from PDU sessions; also, the destination interface is "hair pinned" to ACCESS.

FIG. 10A is an illustrative representation of an inventive mechanism for broadcast packet forwarding of packets between PDU sessions of a VN group according to some implementations. A UPF 1002 may receive an UL packet 1020 from a PDU session associated with the VN group (e.g., PDU-1). In the example of FIG. 10A, UL packet 1020 has a source address of 192.168.1.9/32 and a destination address of 192.168.1.255/32 (which indicates "broadcast"). UPF 1002 has a PDR 1004 associated with PDU-1 indicating a source interface that is set to "Access" and a destination address that is set to "broadcast." If the destination address (e.g., 192.168.1.255/32) of UL packet 1020 is determined to be for broadcast within a VN group, UL packet 1020 is not forwarded to the internal virtual interface as is conventional. Rather, UPF 1002 applies a FAR 1006 associated with PDR 1004 (or PDU-1) which indicates a destination interface that is set to "Access" and an apply action having a predetermined virtual network data indication ("VN_DATA_IND"). The predetermined virtual network data indication is for instructing the UPF 1002 to create a tunnel management message 1040 for the broadcast packet and sent it to the base station (e.g., the gNB). The tunnel management message 1040 is created to have a payload which encapsulates the broadcast packet. In some implementations, the tunnel management message 1040 is created as a GTP-U tunnel management message having a VN Data Indication ("VN Data Indication GTP-U Tunnel Management Message"). In some implementations, the tunnel management message 1040 is created to include the VN Group ID of the VN group. In some implementations, the tunnel management message 1040 is created to include an originator PDU session ID of an originator PDU session of the broadcast packet, when the broadcast packet originates from a PDU session.

In general, the base station will operate to perform unicast data delivery of the broadcast packet to each one of (at least some of) the plurality of UEs of the virtual network group. More particularly, the base station will operate to receive and decapsulate the tunnel management message 1040 to reveal the broadcast packet, consult a stored mapping to select a plurality of PDU session IDs associated with the virtual network group identifier that is identified from the tunnel management message 1040, and for each PDU session ID of the PDU session IDs that are associated with the virtual network group identifier, send a replicated copy of the broadcast packet via a tunnel of the PDU session associated with the PDU session ID for receipt by a UE. The base station may bypass the unicast data delivery of the broadcast packet associated with the originator PDU session ID of the originator PDU session.

More briefly with respect to FIG. 10A, UPF 1002 receives UL packet 1020 from a PDU session; UPF 1002 applies the PDR 1004 (e.g., UL-PDR$_{bcast}$) associated with the PDU session to detect the packet; UPF 1002 applies FAR 1006 (e.g., UL-FAR$_{bcast}$) indicates a destination interface that is set to ACCESS and apply-action that is set to a special value named VN_DATA_INDICATION that is processed as follows: UPF 1002 creates a new GTP-U Tunnel Management message, namely, for example, "VN Data Indication." UPF 1002 encapsulates the broadcast packet, includes the VN Group ID and an Originator PDU session ID in the "VN Data Indication" GTP-U Tunnel Management message, and sends it to the gNB. The gNB receives the "VN Data Indication" GTP-U Tunnel Management message, and extracts the VN Group ID and originator PDU session ID. The gNB walks through all of the PDU sessions associated with the VN group, and transmits the packet to all of those PDU sessions over the air interface. The gNB skips transmitting the packet to the originator PDU session.

For setting up the optimized broadcast messaging according to some implementations of the present disclosure, the following processing may be performed, for example, when a VN group is initially created or configured in the 5G core (e.g., at the SMF and/or UPF). More particularly, the SMF may create a VN group-level N4 Session with the UPF to handle VN group traffic arriving at the N6 and the N19 interface as described in 3GPP TS 23.501 (v17.3.0), Section 5.8.2.13.3.2. As part of the group-level N4 Session, the SMF may provision a special DL PDR/FAR combination (i.e., DL-PDR$_{bcast}$ and DL-FAR$_{bcast}$) to handle broadcast packets arriving at the N6 and N19 interfaces. The UPF may install the DL-PDR$_{bcast}$ and the DL-FAR$_{bcast}$ at the N6 and N16 interfaces for a VN group. The DL PDR/FAR combination may be defined as follows: DL-PDR$_{bcast}$==>Source interface=CORE, Destination-address=[Broadcast address]; and DL-FAR$_{bcast}$==>Apply-action=VN_DATA_ INDICATION, Destination interface=ACCESS. Again, a new apply-action type "VN_DATA_INDICATION" may be used to indicate special handling for broadcast packets arriving at the N6 and the N19 interfaces.

FIG. 10B is an illustrative representation of an inventive mechanism for broadcast packet forwarding of packets from a data network (via an N6 interface) or a UPF (via an N19 interface) for a VN group according to some implementations (see, e.g., FIGS. 2A and 2B). UPF 1002 may receive a DL packet 1030 from the data network or the UPF (e.g., via the N6 interface or the N19 interface) associated with a VN group. In the example of FIG. 10B, DL packet 1030 has a source address of 192.168.1.100/32 and a destination address of 192.168.1.255/32 (which indicates "broadcast"). UPF 1002 has a PDR 1008 indicating a source interface that is set to "Core" and a destination address that is set to "broadcast." If the destination address (e.g., 192.168.1.255/32) of DL packet 1030 is determined to be for broadcast within a VN group, DL packet 1030 is not forwarded to the internal virtual interface as is conventional. Rather, UPF 1002 may apply a FAR 1010 associated with PDR 1008 which indicates a destination interface that is set to "Access" and an apply action having a predetermined virtual network data indication ("VN_DATA_IND"). The predetermined network data indication is for instructing the UPF 1002 to create a tunnel management message 1050 for the broadcast packet and sent it to the base station (e.g., the gNB). The tunnel management message 1050 is created to have a payload which encapsulates the broadcast packet. In some implementations, the tunnel management message 1050 is created as a GTP-U tunnel management message having a VN Data Indication ("VN Data Indication GTP-U Tunnel Management Message"). In some implementations, the tunnel management message 1050 is created to include the VN Group ID of the VN group. In some implementations, the tunnel management message 1040 does not include an originator PDU session ID of an originator PDU session, as none exists (i.e., the broadcast packet did not originate from a PDU session). Note that the base station may operate in the same or similar manner as described in relation to FIG. 10A, without the processing associated with an originator PDU session ID of an originator PDU session, as none exists.

More briefly with respect to FIG. 10B, UPF 1002 receives DL packet 1030 at the N6 or the N19 interface; UPF 1002 applies PDR 1008 (e.g., DL-PDR$_{bcast}$) associated with the VN group-level session; UPF 1002 then applies FAR 1010 (e.g., DL-FAR$_{bcast}$) which has a destination interface that is set to ACCESS and apply-action that is set to a special value named VN_DATA_INDICATION which is processed as follows: UPF 1002 creates a new GTP-U Tunnel Management message, namely "VN Data Indication"; UPF 1002 encapsulates the broadcast packet, includes the VN Group ID in the "VN Data Indication" GTP-U Tunnel Management message, and sends it to the gNB. The gNB receives the "VN Data Indication" GTP-U Tunnel Management message and extracts the VN Group ID. The gNB walks through all of the PDU sessions associated with the VN group and transmits the packet to all those PDU sessions over the air interface.

FIG. 11A is a call flow diagram 1100A of a call flow for processing broadcast data traffic for a plurality of UEs of a VN group in a 5G network according to some implementations of the present disclosure. The call flow of FIG. 11A is for processing packets that originate from a PDU session. The processing in the call flow of FIG. 11A may include the processing of the UPF as described in relation to FIG. 10A. UPF 1002 may be provisioned with the UL-PDR$_{bcast}$ and UL-FAR$_{bcast}$ according to the method of FIG. 9 and/or the call flow of FIG. 12. A VN group 1170 is associated with PDU sessions of UE-1, UE-2, through UE-n.

To begin, one of the UEs may send, via a gNB 1190, a broadcast packet through a PDU session that is routed through UPF 1002 (step 1110 of FIG. 11A). UPF 1002 may receive the broadcast packet, detect and apply the UL-PDR$_{bcast}$ (step 1112 of FIG. 11A), and apply the UL-FAR$_{bcast}$ (step 1114 of FIG. 11A). The apply action of the UL-FAR$_{bcast}$ may indicate a set of actions or instructions 1116 to create a tunnel management message. In particular, the tunnel management message may be created to have a payload which encapsulates the broadcast packet. In some implementations, the tunnel management message may be created as a GTP-U tunnel management message having a VN Data Indication ("VN Data Indication GTP-U Tunnel Management Message"). In some implementations, the tunnel management message may be created to include the VN Group ID of the VN group. In some implementations, the tunnel management message may be created to include an originator PDU session ID of an originator PDU session of the broadcast packet.

UPF 1002 may send the tunnel management message to the gNB 1190 (step 1118 of FIG. 11A). The gNB 1190 will operate to perform unicast data delivery of the broadcast packet to each one of the plurality of UEs of the VN group 1170. More particularly, the gNB 1190 will operate to receive and decapsulate the tunnel management message to reveal the broadcast packet, and consult a stored mapping to select a plurality of PDU session IDs associated with the virtual network group identifier that is identified from the tunnel management message (step 1120 of FIG. 11A. Also, for each PDU session ID of the PDU session IDs that are associated with the virtual network group identifier, the gNB 1190 may send a replicated copy of the broadcast packet via a tunnel of the PDU session associated with the PDU session ID of the VN group 1170 (steps 1122, 1124, etc., of FIG. 11A). The gNB 1190 may bypass the unicast data delivery of the broadcast packet associated with the originator PDU session ID of the originator PDU session.

FIG. 11B is a call flow diagram 1100B of a call flow for processing broadcast data traffic for a plurality of UEs of a VN group in a 5G network according to some implementations of the present disclosure. The call flow of FIG. 11B is for processing packets that originate from a data network (via an N6 interface) or a UPF (via an N19 interface). The processing in the call flow of FIG. 11B may include the processing of the UPF as described in relation to FIG. 10B. Prior to the call flow processing, UPF 1002 may be provisioned with the DL-PDR$_{bcast}$ and DL-FAR$_{bcast}$ according to the method(s) described earlier above.

To begin, the data network or other UPF may send a broadcast packet which is received at UPF 1002 (via the N6 or N19 interface) (step 1130 of FIG. 11B). UPF 1002 detects and applies the DL-PDR$_{bcast}$ (step 1132 of FIG. 11B) and the DL-FAR$_{bcast}$ (step 1134 of FIG. 11B). The apply action of the DL-FAR$_{bcast}$ may indicate a set of actions or instructions 1136 to create a tunnel management message. In particular, the tunnel management message may be created to have a payload which encapsulates the broadcast packet. In some implementations, the tunnel management message may be created as a GTP-U tunnel management message having a VN Data Indication ("VN Data Indication GTP-U Tunnel Management Message"). In some implementations, the tunnel management message may be created to include the VN Group ID of the VN group. The tunnel management message does not include an originator PDU session ID of an originator PDU session, as none exists.

UPF 1002 may send the tunnel management message to the gNB 1190 (step 1138 of FIG. 11B). The gNB 1190 will operate to perform unicast data delivery of the broadcast packet to each one of the PDU sessions of the VN group 1170. More particularly, the gNB 1190 will operate to receive and decapsulate the tunnel management message to reveal the broadcast packet, and consult a stored mapping to select a plurality of PDU session IDs associated with the VN Group ID that is identified from the tunnel management message (step 1140 of FIG. 11B). In addition, for each PDU session ID of the PDU session IDs that are associated with the VN Group ID, the gNB 1190 may send a replicated copy of the broadcast packet via a tunnel of the PDU session associated with the PDU session ID of the VN group 1170 (steps 1142, 1144, etc., of FIG. 11B). The gNB 1190 may operate without the processing associated with an originator PDU session ID of an originator PDU session, as none exists.

FIG. 12 is a call flow diagram 1200 of a call flow for setting up broadcast data traffic processing for a plurality of UEs of a VN group in a 5G network according to some implementations of the present disclosure, for packets originating from a PDU session. The UE-1 may send a PDU session establishment request to an SMF 1180 via the gNB 1190 (step 1202 of FIG. 12). The PDU session establishment request is for invoking a PDU session establishment procedure for establishing a PDU session for the UE-1. In response to the request, SMF 1180 may perform a look up of VN group information (e.g., VN Group ID) for the PDU session or the UE-1 (step 1204 of FIG. 12). SMF 1180 may send a PFCP session establishment request to UPF 1002 for establishing a PFCP session with UPF 1002 and for provisioning the UL-$PDR_{bcast}$ and the UL-$FAR_{bcast}$ associated with the PDU session (step 1206 of FIG. 12). UPF 1002 may install the UL-$PDR_{bcast}$ and the UL-$FAR_{bcast}$ for broadcast packet processing for the PDU session (step 1208 of FIG. 12). SMF 1180 may also send a PDU session resources setup request to the gNB 1190, where the request includes the VN Group ID and the PDU session ID of the PDU session (step 1210 of FIG. 12). The gNB 1190 may build a stored mapping between the VN Group ID and the PDU session ID of the PDU session based on the information as described herein (see, e.g., FIG. 8B) (step 1212 of FIG. 12). A remaining portion of the PDU session establishment procedure may be performed/continued according to conventional processing or otherwise (step 1214 of FIG. 12).

As described above, the proposed techniques and mechanisms optimize broadcast packet handling for a VN group. The techniques and mechanisms may replace, circumvent, or provide an alternative to the two-step mechanism defined in the 5G standards, and also avoid expensive packet replication at the UPF.

In some implementations, the techniques and mechanisms aim to reduce traffic from the UPF to the gNB, and hence would be useful in 5G as a Service (5GaaS) use cases where the UPF may be deployed in the public cloud. A typical enterprise LAN may carry a significant amount of multicast and broadcast traffic. In 5GaaS, the UPF may be deployed in the public cloud. Hence, it would be advantageous to reduce the traffic between on-premises 5G access (e.g., at the gNB) and the 5G core (e.g., the UPF) in the public cloud. The techniques and mechanisms of the present disclosure may improve the performance and help in reducing costs associated with the public cloud, by reducing the amount of broadcast traffic exchanged between the access and the 5G core.

FIG. 13 illustrates a hardware block diagram of a computing device 1300 or a network node that may perform functions associated with operations discussed herein in connection with the techniques described in relation to the above figures. In various embodiments, a computing device, such as computing device 1300 or any combination of computing devices 1300, may be configured as any entity/ entities as discussed for the techniques depicted in connection with the figures in order to perform operations of the various techniques discussed herein. In particular, computing device 1300 may perform operations of a user plane function or a control plane function (e.g., a control unit, an SMF, a centralized unit (CU) or a distributed unit (DU) of a gNB, etc.) for operation in accordance with the processing/ messaging of FIG. 7, 8A-8B, 9, 10A-10B, 11A-11B, and/or 12 (e.g., in an environment such as that described in relation to FIGS. 1A-1B, 2A-2B, and 3-6).

In at least one embodiment, computing device 1300 may include one or more processor(s) 1302, one or more memory element(s) 1304, storage 1306, a bus 1308, one or more network processor unit(s) 1310 interconnected with one or more network input/output (I/O) interface(s) 1312, one or more I/O interface(s) 1314, and control logic 1320. In various embodiments, instructions associated with logic for computing device 1300 can overlap in any manner and are not limited to the specific allocation of instructions and/or operations described herein.

In at least one embodiment, processor(s) 1302 is/are at least one hardware processor configured to execute various tasks, operations and/or functions for computing device 1300 as described herein according to software and/or instructions configured for computing device 1300. Processor(s) 1302 (e.g., a hardware processor) can execute any type of instructions associated with data to achieve the operations detailed herein. In one example, processor(s) 1302 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1304 and/or storage 1306 is/are configured to store data, information, software, and/or instructions associated with computing device 1300, and/or logic configured for memory element(s) 1304 and/or storage 1306. For example, any logic described herein (e.g., control logic 1320) can, in various embodiments, be stored for computing device 1300 using any combination of memory element(s) 1304 and/or storage 1306. Note that in some embodiments, storage 1306 can be consolidated with memory element(s) 1304 (or vice versa), or can overlap/exist in any other suitable manner.

In at least one embodiment, bus 1308 can be configured as an interface that enables one or more elements of computing device 1300 to communicate in order to exchange information and/or data. Bus 1308 can be implemented with any architecture designed for passing control, data and/or information between processors, memory elements/storage, peripheral devices, and/or any other hardware and/or software components that may be configured for computing device 1300. In at least one embodiment, bus 1308 may be implemented as a fast kernel-hosted interconnect, potentially using shared memory between processes (e.g., logic), which can enable efficient communication paths between the processes.

In various embodiments, network processor unit(s) 1310 may enable communication between computing device 1300 and other systems, entities, etc., via network I/O interface(s) 1312 to facilitate operations discussed for various embodiments described herein. In various embodiments, network processor unit(s) 1310 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1300 and other systems, entities, etc. to facilitate operations for various embodiments described herein. In various embodiments, network I/O interface(s) 1312 can be configured as one or more Ethernet port(s), Fibre Channel ports, and/or any other I/O port(s) now known or hereafter developed. Thus, the network processor unit(s) 1310 and/or network I/O interface(s) 1312 may include suitable interfaces for receiving, transmitting, and/or otherwise communicating data and/or information in a network environment.

I/O interface(s) 1314 allow for input and output of data and/or information with other entities that may be connected to computing device 1300. For example, I/O interface(s) 1314 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1320 can include instructions that, when executed, cause processor(s) 1302 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1320) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1304 and/or storage 1306 can store data, software, code, instructions (e.g., processor instructions), logic, parameters, combinations thereof, and/or the like used for operations described herein. This includes memory element(s) 1304 and/or storage 1306 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), VLAN, wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, IoT network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combined multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method of processing broadcast data traffic for a plurality of user equipments (UEs) of a virtual network group in a mobile network, the method comprising:
   at a user plane function,
      receiving a broadcast packet from a UE of the plurality of UEs or a data network;
      performing a packet detection rule (PDR) lookup for the broadcast packet, for identifying a PDR and a forwarding action rule (FAR) associated therewith;
      processing the broadcast packet in accordance with an apply action of the FAR for creating a tunnel management message that indicates broadcast or virtual network group data, includes a virtual network group identifier of the virtual network group, and includes a payload which encapsulates the broadcast packet; and sending the tunnel management message to a base station configured to perform unicast data delivery of the broadcast packet to each of at least some of the plurality of UEs of the virtual network group via a plurality of protocol data unit (PDU) sessions associated with a plurality of PDU session IDs that are stored in association with the virtual network group identifier.

2. The method of claim 1, wherein processing the broadcast packet in accordance with the apply action of the FAR further comprises:

when the broadcast packet is received from the UE of the plurality of UEs, creating the tunnel management message to further include an originator PDU session ID of an originator PDU session of the UE, for instructing a bypassing of the unicast data delivery of the broadcast packet via the originator PDU session of the UE.

3. The method of claim 1, wherein the PDR comprises an uplink (UL) PDR and the FAR comprises an UL FAR, the method further comprising:

at the user plane function, for each protocol data unit (PDU) session establishment procedure for establishing a PDU session for a particular UE in the virtual network group, receiving a control plane session establishment request for creating a control plane session for the particular UE and for provisioning the UL PDR and the UL FAR associated therewith in the user plane function, with the apply action of the UL FAR having a predetermined virtual network data indication for instructing the creating of the tunnel management message for the broadcast packet.

4. The method of claim 1, wherein the PDR comprises a downlink (DL) PDR and the FAR comprises a DL FAR, the method further comprising:

at the user plane function, receiving a control plane session establishment request for creating a group-level control plane session for the virtual network group and for provisioning the DL PDR and the DL FAR associated therewith in the user plane function, with the apply action of the DL FAR having a predetermined virtual network data indication for instructing the creating of the tunnel management message for the broadcast packet.

5. The method of claim 1, wherein the base station is further configured to maintain a stored mapping between the virtual network group identifier and the plurality of PDU session IDs of the plurality of PDU sessions of the at least some of the plurality of UEs, the method further comprising:

at the base station,
receiving, from the user plane function, the tunnel management message which indicates the broadcast or virtual network group data;
decapsulating the tunnel management message to reveal the broadcast packet;
consulting the stored mapping to select the plurality of PDU session IDs that are associated with the virtual network group identifier that is identified from the tunnel management message; and
for each PDU session ID of the plurality of PDU session IDs that are associated with the virtual network group identifier, sending a replicated copy of the broadcast packet via a tunnel of the PDU session associated with the PDU session ID.

6. The method of claim 5, further comprising:
at the base station, building the stored mapping between the virtual network group identifier and the plurality of PDU session IDs by, for each PDU session establishment procedure for establishing a PDU session for a particular UE in the virtual network group:
receiving, from a control plane function for session management, a PDU session resources setup request which includes the virtual network group identifier and a PDU session ID of the PDU session; and
storing, in the stored mapping, the PDU session ID of the PDU session in association with the virtual network group identifier.

7. The method of claim 1, further comprising:
at a control plane function for session management,
receiving, from a particular UE via the base station, a PDU session establishment request for establishing a PDU session for the particular UE;
obtaining a virtual network group identifier based on the PDU session establishment request or the particular UE; and
sending, to the user plane function, a control session establishment request for establishing a control signaling session with the user plane function, and for provisioning the PDR and the FAR with the apply action having a predetermined virtual network data indication for instructing the creating of the tunnel management message for the broadcast packet.

8. A network node comprising:
one or more processors;
one or more interfaces to connect for communications in a mobile network; and
one or more memory elements for storing instructions executable by the one or more processors for operation as a user plane function, including operation for processing broadcast data traffic for a plurality of user equipments (UEs) of a virtual network group by:
receiving a broadcast packet from a UE of the plurality of UEs or a data network;
performing a packet detection rule (PDR) lookup for the broadcast packet, for identifying a PDR and a forwarding action rule (FAR) associated therewith;
processing the broadcast packet in accordance with an apply action of the FAR for creating a tunnel management message that indicates broadcast or virtual network group data, includes a virtual network group identifier of the virtual network group, and includes a payload which encapsulates the broadcast packet; and
sending the tunnel management message to a base station configured to perform unicast data delivery of the broadcast packet to each of at least some of the plurality of UEs of the virtual network group via a plurality of protocol data unit (PDU) sessions associated with a plurality of PDU session IDs that are stored in association with the virtual network group identifier.

9. The network node of claim 8, wherein the instructions are executable by the one or more processors for processing the broadcast packet in accordance with the apply action of the FAR further comprises:

when the broadcast packet is received from the UE of the plurality of UEs, creating the tunnel management message to further include an originator PDU session ID of an originator PDU session of the UE, for instructing a bypassing of the unicast data delivery of the broadcast packet via the original PDU session of the UE.

10. The network node of claim 8, wherein the PDR comprises an uplink (UL) PDR and the FAR comprises an UL FAR, and the instructions are executable by the one or more processors for operation further including:
  during each protocol data unit (PDU) session establishment procedure for establishing a PDU session for a particular UE in the virtual network group, receiving a control plane session establishment request for creating a control plane session for the particular UE and for provisioning the UL PDR and the UL FAR associated therewith in the user plane function, with the apply action of the UL FAR having a predetermined virtual network data indication for instructing the creating of the tunnel management message for the broadcast packet.

11. The network node of claim 8, wherein the PDR comprises a downlink (DL) PDR and the FAR comprises a DL FAR, and the instructions are executable by the one or more processors for operation further including:
  receiving a control plane session establishment request for creating a group-level control plane session for the virtual network group and for provisioning the DL PDR and the DL FAR associated therewith in the user plane function, with the apply action of the DL FAR indicating a predetermined virtual network data indication for instructing the creating of the tunnel management message for the broadcast packet.

12. A computer program product comprising:
  a non-transitory computer readable medium; and
  instructions stored in the non-transitory computer readable medium;
  the instructions being executable on one or more processors of a network node for operation as a user plane function, including operation for processing broadcast data traffic for a plurality of user equipments (UEs) of a virtual network group by:
    receiving a broadcast packet from a UE of the plurality of UEs or a data network;
    performing a packet detection rule (PDR) lookup for the broadcast packet, for identifying a PDR and a forwarding action rule (FAR) associated therewith;
    processing the broadcast packet in accordance with an apply action of the FAR for creating a tunnel management message that indicates broadcast or virtual network group data, includes a virtual network group identifier of the virtual network group, and includes a payload which encapsulates the broadcast packet; and
    sending the tunnel management message to a base station configured to perform unicast data delivery of the broadcast packet to each one of at least some of the plurality of UEs of the virtual network group via a plurality of protocol data unit (PDU) sessions associated with a plurality of PDU session IDs that are stored in association with the virtual network group identifier.

13. The computer program product of claim 12, wherein the PDR comprises an uplink (UL) PDR and the FAR comprises an UL FAR, and the instructions are executable by the one or more processors for operation further including:
  during each protocol data unit (PDU) session establishment procedure for establishing a PDU session for a particular UE in the virtual network group, receiving a control plane session establishment request for creating a control plane session for the particular UE and for provisioning the UL PDR and the UL FAR associated therewith in the user plane function, with the apply action of the UL FAR having a predetermined virtual network data indication for instructing the creating of the tunnel management message for the broadcast packet.

14. The computer program product of claim 12, wherein the PDR comprises a downlink (DL) PDR and the FAR comprises a DL FAR, and the instructions are executable by the one or more processors for operation further including:
  receiving a control plane session establishment request for creating a group-level control plane session for the virtual network group and for provisioning the DL PDR and the DL FAR associated therewith in the user plane function, with the apply action of the DL FAR having a predetermined virtual network data indication for instructing the creating of the tunnel management message for the broadcast packet.

15. The computer program product of claim 12, wherein processing the broadcast packet in accordance with the apply action of the FAR further comprises:
  when the broadcast packet is received from the UE of the plurality of UEs, creating the tunnel management message to further include an originator PDU session ID of an originator PDU session of the UE, for instructing a bypassing of the unicast data delivery of the broadcast packet via the originator PDU session of the UE.

16. The computer program product of claim 12, wherein the base station is further configured to maintain a stored mapping between the virtual network group identifier and the plurality of PDU session IDs of the plurality of PDU sessions of the at least some of the plurality of UEs, wherein the base station is further configured to:
  receive, from the user plane function, the tunnel management message which indicates the broadcast or virtual network group data;
  decapsulate the tunnel management message to reveal the broadcast packet;
  consult the stored mapping to select the plurality of PDU session IDs that are associated with the virtual network group identifier that is identified from the tunnel management message; and
  for each PDU session ID of the plurality of PDU session IDs that are associated with the virtual network group identifier, send a replicated copy of the broadcast packet via a tunnel of the PDU session associated with the PDU session ID.

17. The computer program product of claim 16, wherein the base station is further configured to:
  build the stored mapping between the virtual network group identifier and the plurality of PDU session IDs by, for each PDU session establishment procedure for establishing a PDU session for a particular UE in the virtual network group:
    receiving, from a control plane function for session management, a PDU session resources setup request which includes the virtual network group identifier and a PDU session ID of the PDU session; and
    storing, in the stored mapping, the PDU session ID of the PDU session in association with the virtual network group identifier.

18. The network node of claim 8, wherein the base station is further configured to maintain a stored mapping between the virtual network group identifier and the plurality of PDU session IDs of the plurality of PDU sessions of the at least some of the plurality of UEs.

* * * * *